US011831692B2

(12) United States Patent
Lewis

(10) Patent No.: US 11,831,692 B2
(45) Date of Patent: Nov. 28, 2023

(54) ASYNCHRONOUS VIDEO COMMUNICATION INTEGRATION SYSTEM

(71) Applicant: eduPresent LLC, Loveland, CO (US)

(72) Inventor: Jeffrey S. Lewis, Fort Collins, CO (US)

(73) Assignee: Bongo Learn, Inc., Loveland, CO (US)

(*) Notice: Subject to any disclaimer, the term of this patent is extended or adjusted under 35 U.S.C. 154(b) by 827 days.

(21) Appl. No.: 14/480,509

(22) Filed: Sep. 8, 2014

(65) Prior Publication Data

US 2015/0222682 A1 Aug. 6, 2015

Related U.S. Application Data

(63) Continuation-in-part of application No. 14/174,127, filed on Feb. 6, 2014, now Pat. No. 10,191,647.

(51) Int. Cl.
*G06F 3/00* (2006.01)
*H04L 65/401* (2022.01)
(Continued)

(52) U.S. Cl.
CPC ........ *H04L 65/4015* (2013.01); *G06F 16/958* (2019.01); *G09B 5/12* (2013.01);
(Continued)

(58) Field of Classification Search
CPC ...... G06F 3/048; G06F 3/0482; G06F 16/958; H04L 65/4015; H04L 65/403; G09B 5/12;
(Continued)

(56) References Cited

U.S. PATENT DOCUMENTS 5,764,901 A 6/1998 Skarbo et al.
6,154,631 A 11/2000 Remschel
(Continued)

FOREIGN PATENT DOCUMENTS

AU 2013274565 2/2016
AU 2011320948 3/2017
(Continued)

OTHER PUBLICATIONS

PCT International Patent Application No. PCT/US15/14493; International Search Report and Written Opinion dated May 14, 2015, 14 pages total.

(Continued)

*Primary Examiner* — Kieu D Vu
*Assistant Examiner* — Andrew Chung
(74) *Attorney, Agent, or Firm* — Craig R. Miles; CR MILES P.C.

(57) ABSTRACT

Generally an asynchronous video communication integration system which includes a computer code served from by a server computer to a plurality of client computers to implement a common graphical user interface which by client user interaction allows reciprocal asynchronous video communication between a first client user and a second client user with a first video file through the final video file of an asynchronous video communication coupled as a combined video file which can be played back by the first and second client users, or a plurality of client users, as continuous synchronous video communication.

22 Claims, 22 Drawing Sheets

(51) Int. Cl.
  *H04N 21/854* (2011.01)
  *H04N 21/44* (2011.01)
  *H04L 65/403* (2022.01)
  *G09B 5/12* (2006.01)
  *G06F 16/958* (2019.01)
  *G06Q 10/101* (2023.01)

(52) U.S. Cl.
  CPC ..... *H04L 65/403* (2013.01); *H04N 21/44016* (2013.01); *H04N 21/854* (2013.01); *G06Q 10/101* (2013.01)

(58) Field of Classification Search
  CPC ........... H04N 21/44016; H04N 21/854; G06Q 10/101
  See application file for complete search history.

(56) References Cited

U.S. PATENT DOCUMENTS

| | | | |
|---|---|---|---|
| 6,471,521 B1 | 10/2002 | Dornbush et al. | |
| 6,484,316 B1 | 11/2002 | Lindberg | |
| 6,559,863 B1* | 5/2003 | Megiddo | H04L 12/1827 348/14.08 |
| 7,185,054 B1 | 2/2007 | Ludwig et al. | |
| 7,506,262 B2 | 3/2009 | Gupta et al. | |
| 7,623,755 B2* | 11/2009 | Kuspa | G11B 27/034 386/278 |
| 7,809,802 B2* | 10/2010 | Lerman | G06F 17/30017 709/203 |
| 7,908,602 B2 | 3/2011 | Alcorn | |
| 8,140,973 B2 | 3/2012 | Sandquist et al. | |
| 8,275,816 B1* | 9/2012 | Pegg | G11B 27/105 707/829 |
| 8,640,030 B2 | 1/2014 | Kulas | |
| 8,799,757 B2* | 8/2014 | Jewsbury | G11B 27/005 715/200 |
| 8,806,320 B1 | 8/2014 | Abdo | |
| 8,831,505 B1 | 9/2014 | Seshardi | |
| 8,848,025 B2* | 9/2014 | Talukder | H04L 12/1818 348/14.02 |
| 8,887,050 B1* | 11/2014 | Siracusano, Jr. | G06F 3/0481 715/716 |
| 9,591,072 B2 | 3/2017 | Scherbel et al. | |
| 9,858,317 B1* | 1/2018 | Horling | G06F 16/285 |
| 9,866,795 B2* | 1/2018 | Caldwell | G06T 13/40 |
| 2002/0059342 A1 | 5/2002 | Gupta et al. | |
| 2002/0105598 A1 | 8/2002 | Tai et al. | |
| 2002/0115051 A1 | 8/2002 | Sanda | |
| 2003/0073064 A1 | 4/2003 | Riggs | |
| 2003/0152904 A1 | 8/2003 | Doty, Jr. | |
| 2003/0174160 A1 | 9/2003 | Deutscher et al. | |
| 2003/0208543 A1* | 11/2003 | Enete | H04L 12/1822 709/206 |
| 2004/0012621 A1 | 1/2004 | Kaneko et al. | |
| 2004/0014021 A1 | 1/2004 | Suleiman | |
| 2004/0143630 A1 | 7/2004 | Kaufmann et al. | |
| 2004/0153504 A1 | 8/2004 | Hutchinson | |
| 2005/0025320 A1* | 2/2005 | Barry | G11B 27/034 381/119 |
| 2005/0081159 A1 | 4/2005 | Gupta et al. | |
| 2005/0234958 A1 | 10/2005 | Sipusic et al. | |
| 2006/0111902 A1 | 5/2006 | Julia et al. | |
| 2006/0119707 A1 | 6/2006 | Merrell et al. | |
| 2006/0277453 A1 | 12/2006 | Smith et al. | |
| 2006/0286527 A1 | 12/2006 | Morel | |
| 2007/0033632 A1* | 2/2007 | Baynger | G11B 27/034 725/135 |
| 2007/0074116 A1 | 3/2007 | Thomas | |
| 2007/0088601 A1 | 4/2007 | Money et al. | |
| 2007/0136656 A1 | 6/2007 | Nydam et al. | |
| 2007/0174774 A1* | 7/2007 | Lerman | G06F 17/30017 715/723 |
| 2007/0234214 A1 | 10/2007 | Lovejoy et al. | |
| 2007/0245243 A1 | 10/2007 | Lanza et al. | |
| 2008/0092047 A1* | 4/2008 | Fealkoff | G11B 27/11 715/716 |
| 2008/0133736 A1 | 6/2008 | Wensley et al. | |
| 2008/0134057 A1* | 6/2008 | Yun | H04N 7/147 715/758 |
| 2008/0254425 A1 | 10/2008 | Cohen | |
| 2008/0270467 A1 | 10/2008 | Clarke | |
| 2008/0286739 A1 | 11/2008 | Umrigar et al. | |
| 2009/0152349 A1 | 6/2009 | Bonev et al. | |
| 2009/0164904 A1 | 6/2009 | Horowitz et al. | |
| 2009/0186605 A1* | 7/2009 | Apfel | H04M 3/56 455/416 |
| 2009/0225164 A1* | 9/2009 | Renkis | G08B 13/19656 348/143 |
| 2009/0288011 A1* | 11/2009 | Piran | G08B 13/19693 715/720 |
| 2010/0011292 A1 | 1/2010 | Marinkovich et al. | |
| 2010/0153850 A1 | 6/2010 | Hariton | |
| 2010/0251177 A1 | 9/2010 | Geppert et al. | |
| 2010/0262916 A1* | 10/2010 | Jones | G06Q 10/10 707/812 |
| 2010/0274847 A1 | 10/2010 | Anderson et al. | |
| 2010/0281384 A1* | 11/2010 | Lyons | G06F 3/048 715/723 |
| 2010/0293478 A1 | 11/2010 | Dahlgren | |
| 2010/0322589 A1 | 12/2010 | Henderson et al. | |
| 2011/0010624 A1* | 1/2011 | Vanslette | G06F 3/0485 715/704 |
| 2011/0026898 A1 | 2/2011 | Lussier et al. | |
| 2011/0109717 A1 | 5/2011 | Nimon et al. | |
| 2011/0119392 A1* | 5/2011 | Shamilian | H04N 21/26616 709/231 |
| 2011/0214045 A1* | 9/2011 | Sumler | G11B 27/034 715/202 |
| 2011/0231194 A1 | 9/2011 | Lewis | |
| 2012/0036423 A1 | 2/2012 | Haynes et al. | |
| 2012/0210217 A1* | 8/2012 | Abbas | G11B 27/031 715/716 |
| 2012/0221952 A1* | 8/2012 | Chavez | H04N 21/8126 715/733 |
| 2012/0288845 A1 | 11/2012 | Kumar GL | |
| 2013/0073964 A1* | 3/2013 | Meaney | G11B 27/34 715/716 |
| 2013/0125000 A1* | 5/2013 | Fleischhauer | G11B 27/031 715/723 |
| 2013/0145269 A1* | 6/2013 | Latulipe | G06F 3/048 715/720 |
| 2013/0298025 A1 | 11/2013 | Lewis et al. | |
| 2013/0298026 A1* | 11/2013 | Fitzpatrick | G11B 27/034 715/723 |
| 2013/0298043 A1* | 11/2013 | Bailey | H04L 65/403 715/753 |
| 2013/0332879 A1 | 12/2013 | Lewis | |
| 2014/0089800 A1* | 3/2014 | Kao | H04N 21/4756 715/719 |
| 2014/0089801 A1* | 3/2014 | Agrawal | G06F 3/0484 715/719 |
| 2014/0108562 A1 | 4/2014 | Panzer | |
| 2014/0187218 A1* | 7/2014 | Carrelli | H04W 4/16 455/416 |
| 2014/0215356 A1* | 7/2014 | Brander | H04L 67/36 715/753 |
| 2014/0229835 A1* | 8/2014 | Ravine | H04L 65/60 715/720 |
| 2014/0279852 A1* | 9/2014 | Chen | G06F 17/30023 707/609 |
| 2015/0006759 A1 | 1/2015 | Scherbel et al. | |
| 2015/0058709 A1* | 2/2015 | Zaletel | G06F 16/252 715/202 |
| 2015/0074539 A1* | 3/2015 | Hou | G06F 16/285 715/739 |
| 2015/0121225 A1* | 4/2015 | Somasundaram | H04N 21/42224 715/721 |

(56) References Cited

U.S. PATENT DOCUMENTS

2015/0149929 A1* 5/2015 Shepherd .............. H04L 65/403
715/753
2016/0334967 A1* 11/2016 Rottler ................... H04L 67/10
2017/0010903 A1* 1/2017 Kidron .................. G06F 3/0482

FOREIGN PATENT DOCUMENTS

EP         2667340 A1   11/2013
WO    WO 2012/057835    5/2012
WO    WO 2013/188290   12/2013

OTHER PUBLICATIONS

ZeeBigBang. FORscene Tutorial (full). Vimeo. N.p., Oct. 14, 2010. Website, https://vimeo.com/15836683, originally downloaded Sep. 1, 2015, 1 page.
Apple. iPhone User Guide for iOS 4.2 Software; Copyright 2010, 5 total pages (excerpt).
Corresponding U.S. Appl. No. 13/842,846; Office Action dated Dec. 31, 2014.
U.S. Appl. No. 61/658,298, filed Jun. 11, 2012.
U.S. Appl. No. 61/407,548, filed Oct. 28, 2010.
U.S. Appl. No. 61/441,670, filed Feb. 11, 2011.
U.S. Appl. No. 14/174,127, filed Feb. 6, 2014.
European Patent Application No. 13804359.1; Office Action dated Mar. 7, 2017, 7 pages total.
U.S. Appl. No. 15/409,935, filed Jan. 19, 2017.
GoReact. Affordable Online Video Assessment. Website, httos://goreact.com, originally downloaded Mar. 28, 2017, 5 pages total.
Kira Talent. Video Admissions Platform. Website, https://www.kiratalent.com, originally downloaded Apr. 3, 2017, 7 pages total.
GoReact Blog. Introducing GoReact Slide Sync. Website, https://blog.goreact.com, originally downloaded Apr. 21, 2017, 4 pages total.
GoReact. Affordable Online Video Assessment. Website, https://goreact.com, originally downloaded Mar. 28, 2017, 5 pages total.
Australian Patent Application No. 2017201408; Office Action dated Jan. 15, 2018, 4 pages total.
Australian Patent Application No. 2017201408; Office Action dated Jan. 14, 2019, 6 pages total.
Australian Patent Application No. 2015214261; Office Action dated Jan. 31, 2019, 5 pages total.
European Patent Application No. 13804359.1; Office Action dated Jan. 27, 2016, 6 pages total.
European Patent Application No. 15746331.6; Office Action dated Aug. 23, 2017, 6 pages total.
European Patent Application No. 11836763.0; Office Action dated Apr. 23, 2019, 9 pages total.
Australian Patent Application No. 2015214261; Office Action dated Apr. 8, 2019, 4 pages total.
Australian Patent Application No. 2011320948; Office Action dated Mar. 18, 2016, 4 pages total.
Australian Patent Application No. 2011320948; Office Action dated Oct. 28, 2016, 2 pages total.
Australian Patent Application No. 2017201408; Office Action dated Apr. 18, 2018, 4 pages total.
Australian Patent Application No. 2017201408; Office Action dated Dec. 19, 2018, 5 pages total.
Australian Patent Application No. 2017201408; Office Action dated Jan. 8, 2019, 4 pages total.
Australian Patent Application No. 2017201408; Office Action dated Jun. 28, 2018, 4 pages total.
Canadian Patent Application No. 2,949,204; Office Action dated Oct. 10, 2017, 6 pages total.
Canadian Patent Application No. 2,853,480; Office Action dated Mar. 20, 2018, 4 pages total.
Canadian Patent Application No. 2,914,902; Office Action dated Jun. 10, 2016, 6 pages total.
Canadian Patent Application No. 2,914,902; Office Action dated Dec. 13, 2016, 6 pages total.
Canadian Patent Application No. 2,914,902; Office Action dated Feb. 1, 2017, 5 pages total.
Canadian Patent Application No. 2,914,902; Notice of Allowance dated Apr. 13, 2017, 1 page.
Jourdan et al. Authoring Smil documents by direct manipulations during presentation; World Wide Web, Jan. 1999, 2(4), pp. 179-190; Baltzer Science Publishers, Bussum, NL.
U.S. Appl. No. 15/284,408; Office Action dated Feb. 4, 2020.
Australian Patent Application No. 2019200258; Examination Report No. 1, dated Nov. 6, 2019, 4 pages.
Australian Patent Application No. 2019200258; Examination Report No. 2, dated May 6, 2020, 5 pages.
U.S. Appl. No. 15/729,149; Office Action dated Mar. 11, 2020.
Wong et al. Web based educational video teaching and learning platform with collaborative annotation. Ninth IEEE International Conference on Advanced Learning Technologies, published Jul. 15, 2009, pp. 696-700, <URL: http://citeseerx.ist.psu.edu/viewdoc/download?doi=10.1.1.469.3322&rep=rep1 &type=pdf>.
U.S. Appl. No. 16/655,354; Office Action dated Sep. 17, 2020.
HP WebCam User Guide. Feb. 2012 (retrieved on Sep. 10, 2020); retrieved from internet: <URL: http://h10032.www1.hp.com/etg/Manual/c03367177.pdf> (Year: 2012).
European Patent Application No. 15746331.6; Office Action dated Sep. 8, 2020, 8 pages.
European Patent Application No. 15746331.6; Office Action dated Jun. 24, 2021, 8 pages.
U.S. Appl. No. 16/655,354, Office Action dated Feb. 23, 2021.

* cited by examiner

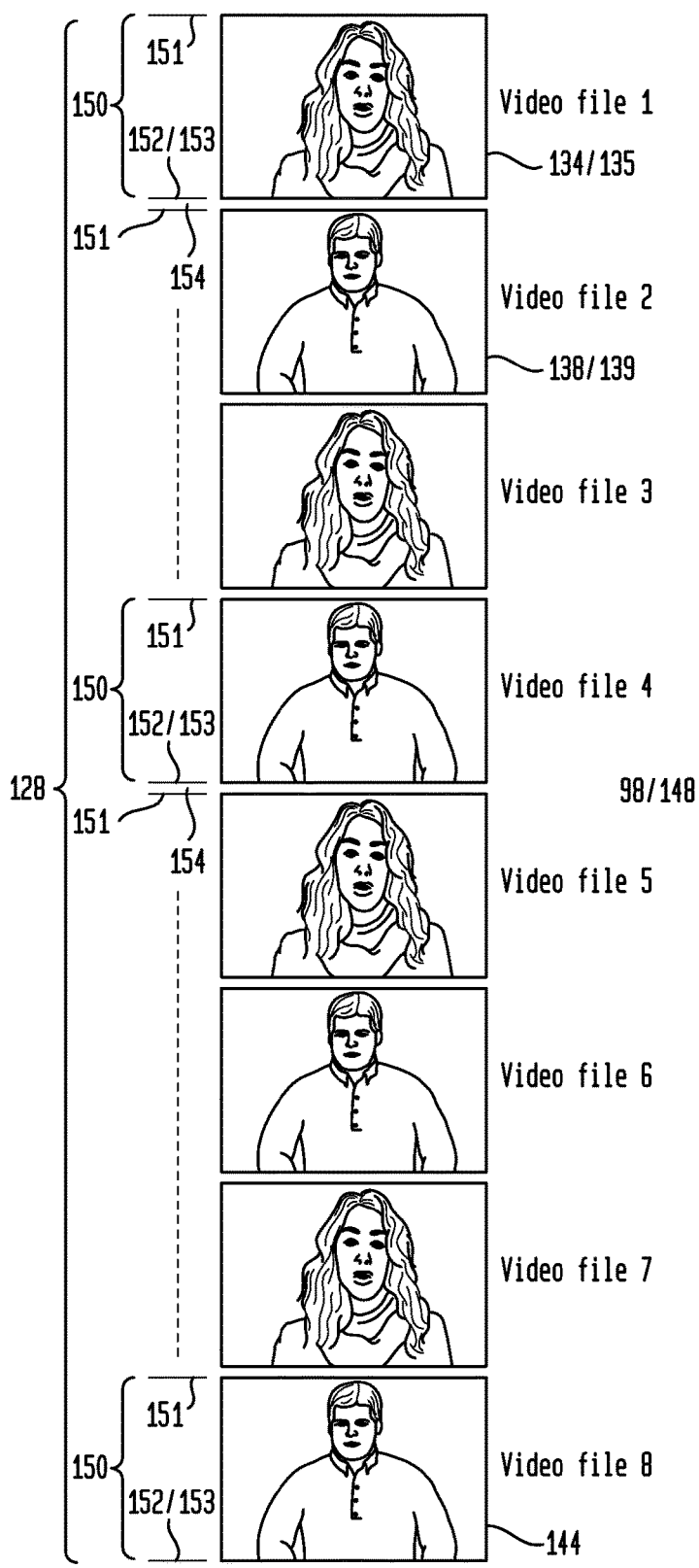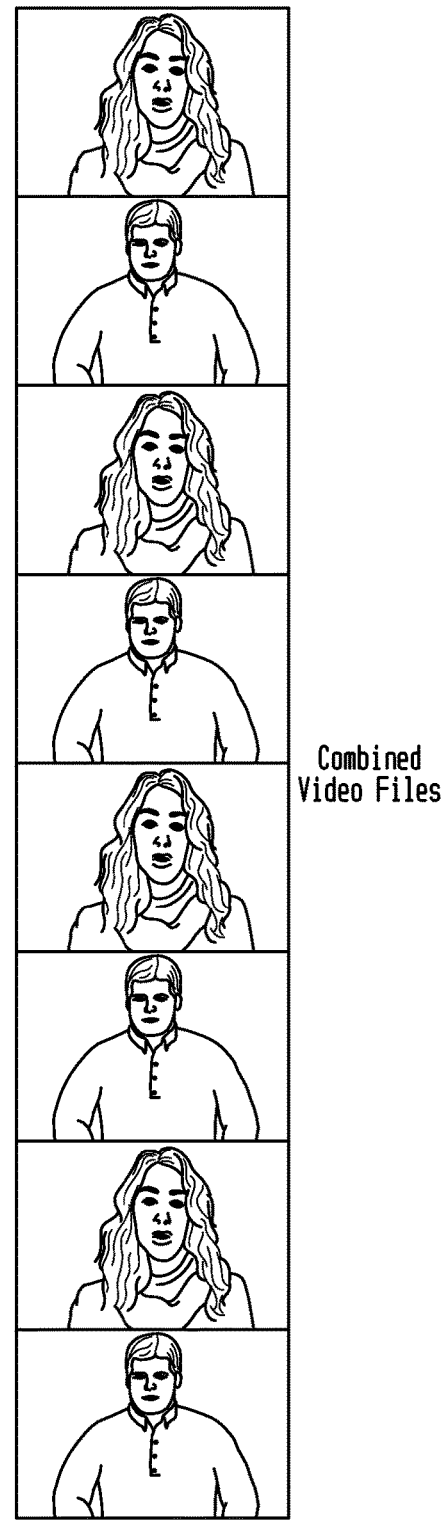

ASYNCHRONOUS VIDEO COMMUNICATION INTEGRATION SYSTEM

This United States Patent Application is a continuation-in-part of U.S. patent application Ser. No. 14/174,127, filed Feb. 6, 2014, hereby incorporated by reference herein.

I. FIELD OF THE INVENTION

Generally, a computer implemented group distance learning system including one or more servers which serve a group distance learning computer code executable to provide a graphical user interface which by client user interaction allows a plurality of client users to be allocated into a plurality of client user groups, each client user group having access to a common graphical user interface to collaborate in the performance of group assignments. Specifically, a group distance learning computer code which implements a graphical user interface accessed in common by a plurality of client users from remote locations to facilitate collaborative group video production.

II. BACKGROUND OF THE INVENTION

Conventional computer-implemented systems for distance learning may not provide computer elements, network elements, and a computer code executable to implement a graphical user interface which allows a plurality of computer users at remote locations to be allocated into a plurality of user groups with each group member having access to a common graphical user interface which by user interaction allows each group member to collaborate in the performance of group assignments.

The instant invention addresses each of these concerns with respect to the conventional technology.

III. SUMMARY OF THE INVENTION

Accordingly, a broad object of particular embodiments of the invention can be to provide computer elements, network elements, and a computer code executable to implement a graphical user interface for group distance learning which by click event allow a plurality of client users to be allocated into a plurality of client user groups, each client user group having access to a common graphical user interface to collaborate in the performance of group assignments.

Another broad object of particular embodiments of the invention can be to provide a method in a computer system for collaborative production of group assignments implemented by serving a computer code executable for displaying a graphical user interface on the graphical display surface of a plurality of computers for allocating a plurality of client users into a plurality of client user groups having access to a common graphical user interface for collaborating in the performance of group assignments.

Another broad object of particular embodiments of the invention can be to provide a computer code executable to display a graphical user interface on a graphical display surface of a plurality of computers which by click event allocates a plurality of client users into a plurality of client user groups, each client user group having access to a common graphical user interface for collaborating in the performance of group assignments.

Another broad object of particular embodiments of the invention can be to provide a user interface for depiction on a graphical display surface which by click event allocates a plurality of client users into a plurality of client user groups, each client user group having access to a common graphical user interface for collaborating in the performance of group assignments.

Another broad object of particular embodiments of the invention can be to provide a computer code which implements a graphical user interface which allows each of a plurality of computer users at remote locations to correspondingly submit a plurality of video files with the video file identifiers displayed in the graphical user interface for subsequent movement into a pre-determined serial order for storage and subsequent serial order playback in a video image display area as a combined video image accessible by each of the plurality of computer users.

Another broad object of particular embodiments of the invention can be to provide a computer code which implements a graphical user interface which concurrently displays a video image display area and a media image display area on the graphical display surface of a plurality of remote computers in a client user group by which client user interaction allows serial order playback of a combined video image, as above described, in the video image display area and by further client user interaction allows playback of the combined video image to be paused for retrieval of a media file to be corresponding displayed in the media image display area, and further allows each client user in the client user group to couple a plurality of media images in synchronized timed relation to the combined video image by which, upon subsequent retrieval of the combined video file and presentation of the corresponding combined video image in the video image display area, the media images can be display in the media image display area in synchronized timed relation to the combined video image to provide a combined video-media image.

Another broad object of particular embodiments of the invention can be to provide a computer code which implements a graphical user interface which functions to concurrently display on the display surface of a plurality of computers associated with one or more client user groups a video image display area, a media image display area and an annotation display area which allows entry by the client users of one or more client user groups to enter one or more annotations into the annotation display area in synchronized timed relation to the combined video-media image presented in the corresponding video image display area and media image display area.

Another broad object of particular embodiments of the invention can be to provide an asynchronous video communication integration system which includes a computer code served from by a server computer to a plurality of client computers to implement a common graphical user interface which by client user interaction allows reciprocal asynchronous video communication between a first client user and a second client user with a first video file through the final video file of an asynchronous video communication coupled as a combined video file which can be played back by the first and second client users (or a plurality of client users) as continuous synchronous video communication.

Naturally, further objects of the invention are disclosed throughout other areas of the specification and drawings.

IV. BRIEF DESCRIPTION OF THE DRAWINGS

Figure 17:
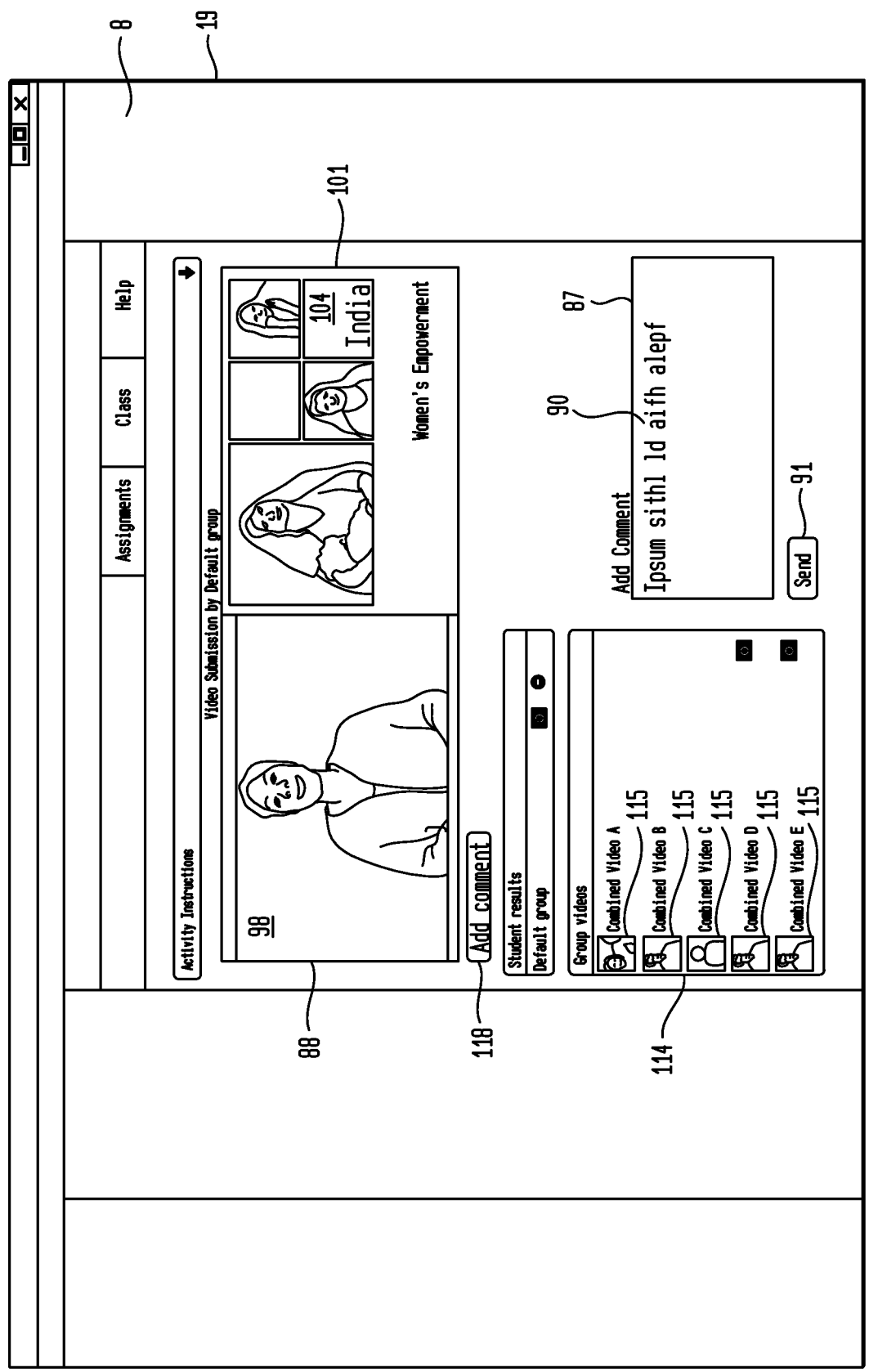

FIG. 17 shows a particular embodiment of a graphical user interface which concurrently displays a combined video image in the video image display area and displays in synchronized timed relation a plurality of media images in the adjacent media image display area along a plurality of annotations which by click event are coupled in timed synchronization with display of the combined video image and display of the plurality of media images in the media image display area.

Figure 18:
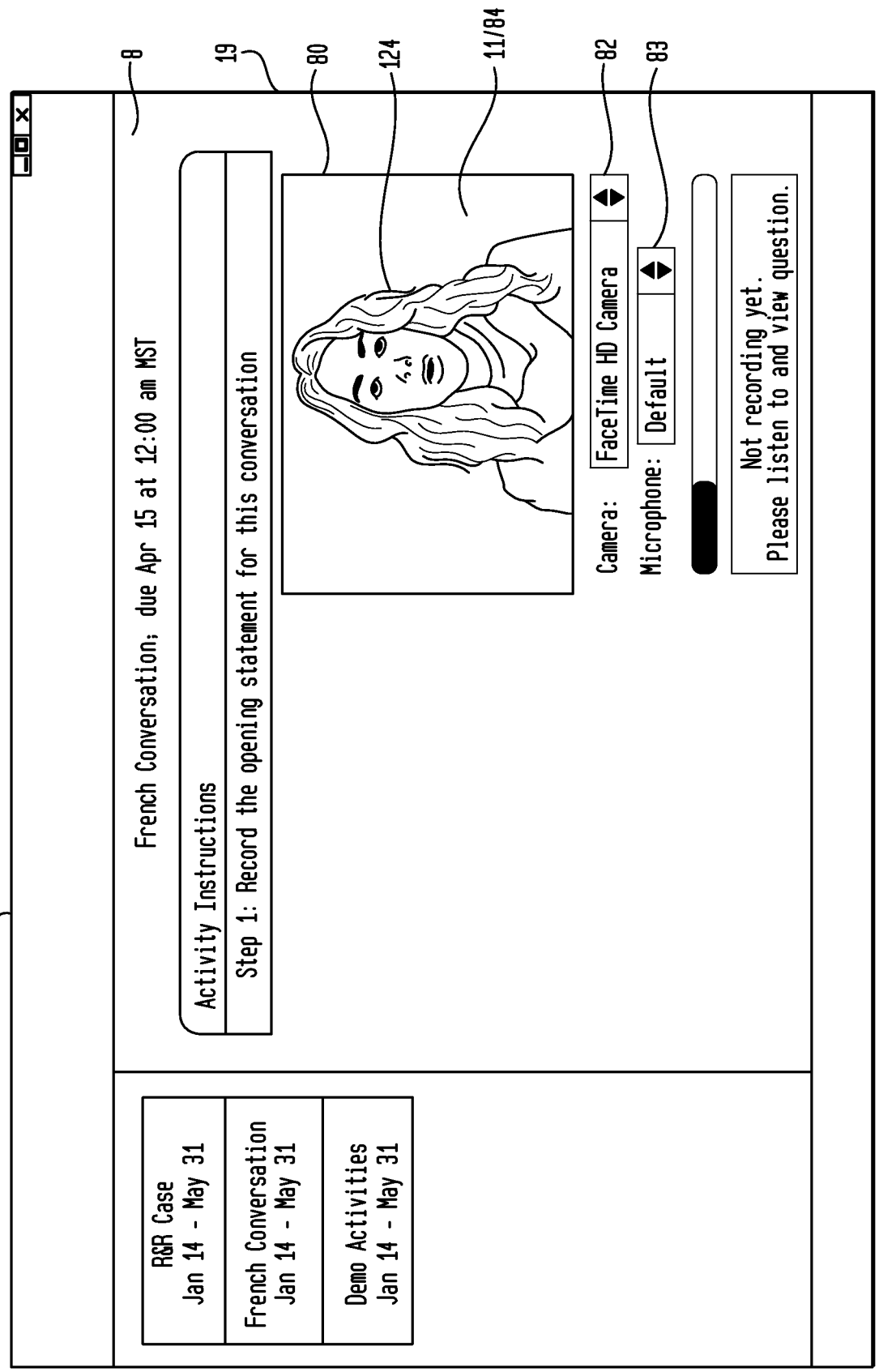

FIG. 18 shows a particular embodiment of a graphical user interface on a display surface of a first client computer which includes a video capture area controllable by first client user interaction to capture an image and associated audio as a first video file.

Figure 19:
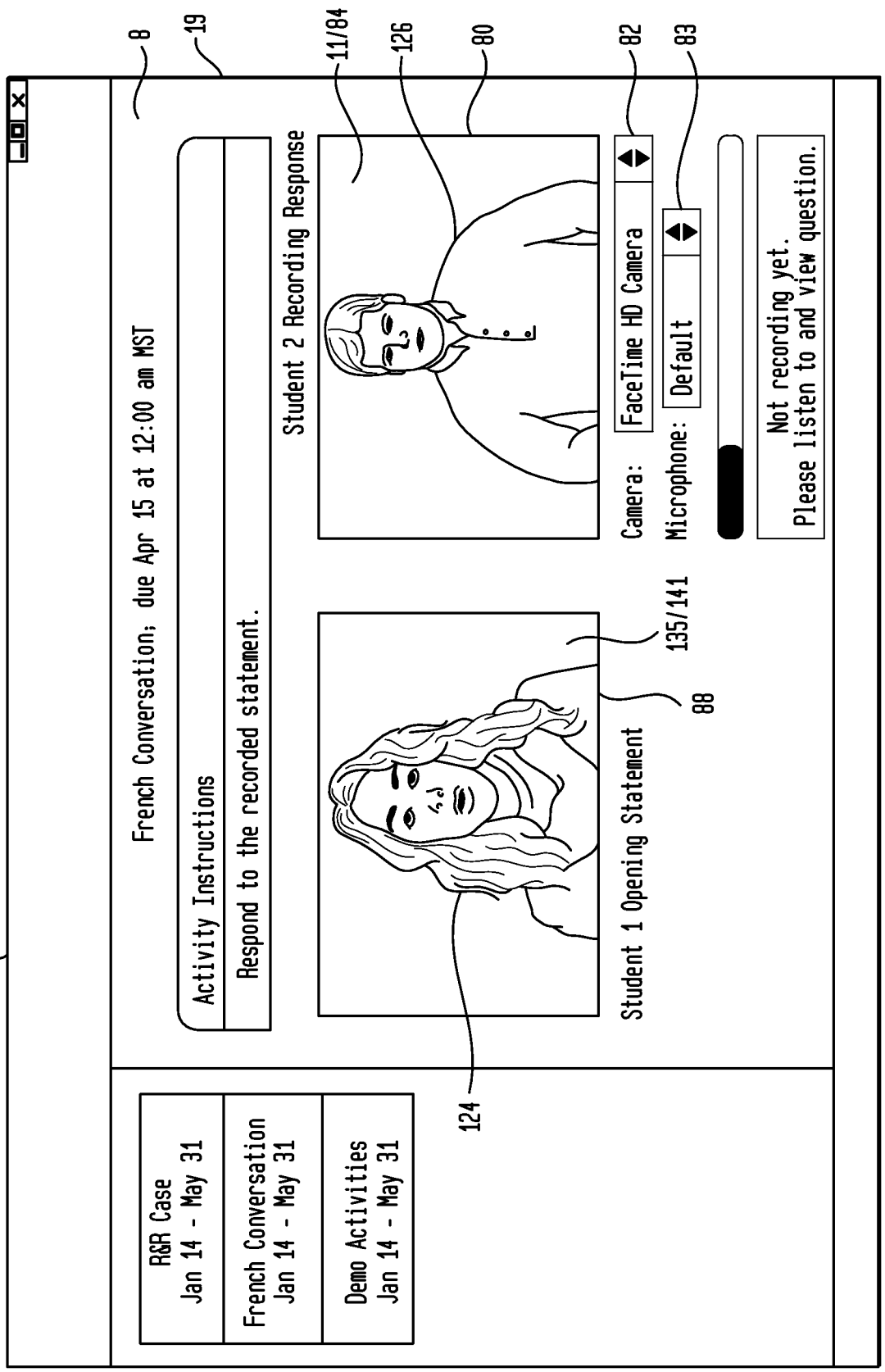

FIG. 19 shows a particular embodiment of a graphical user interface on a display surface of a second client computer which concurrently displays a video image display area which allows play back of the first video file as a first asynchronous video communication and a video capture area controllable by second client user interaction to capture an image and associated audio as a second video file in reply to the a first asynchronous video communication.

Figure 20:
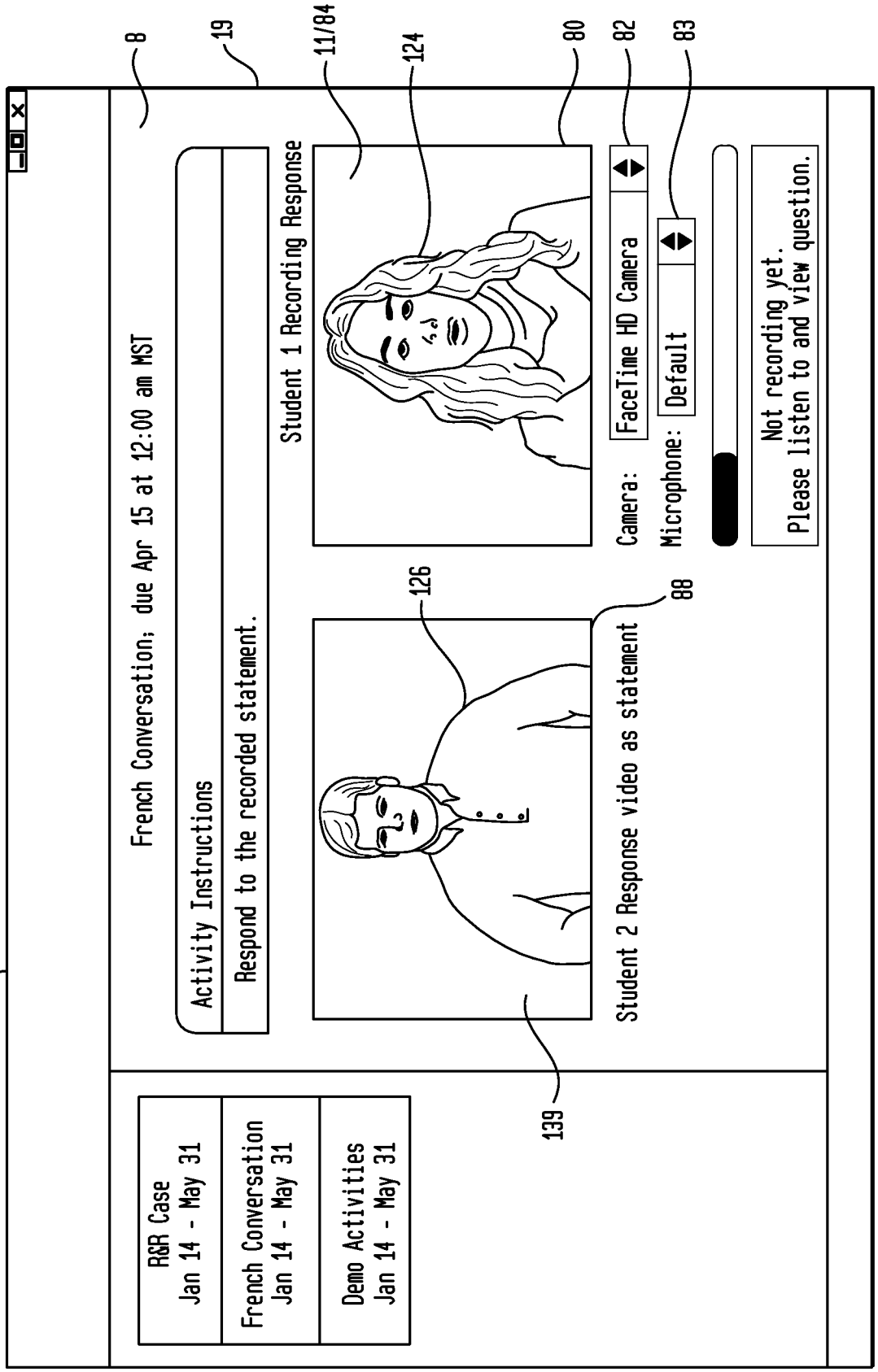

FIG. 20 shows a particular embodiment of a graphical user interface on the display surface of the first client computer which concurrently displays a video image display area which allows play back of the second video file as a second asynchronous video communication and a video capture area controllable by first client user interaction to capture an image and associated audio as a third video file in reply to the second asynchronous video communication.

FIG. 21A represents a plurality of asynchronous video communications comprising discrete reciprocal play back of a plurality of video files between the first client user and the second client user.

FIG. 21B represents a synchronous video communication comprising a continuous play back of a combined video file including the plurality of video files generated in the asynchronous video communication between the first client user and the second client user.

Figure 22:
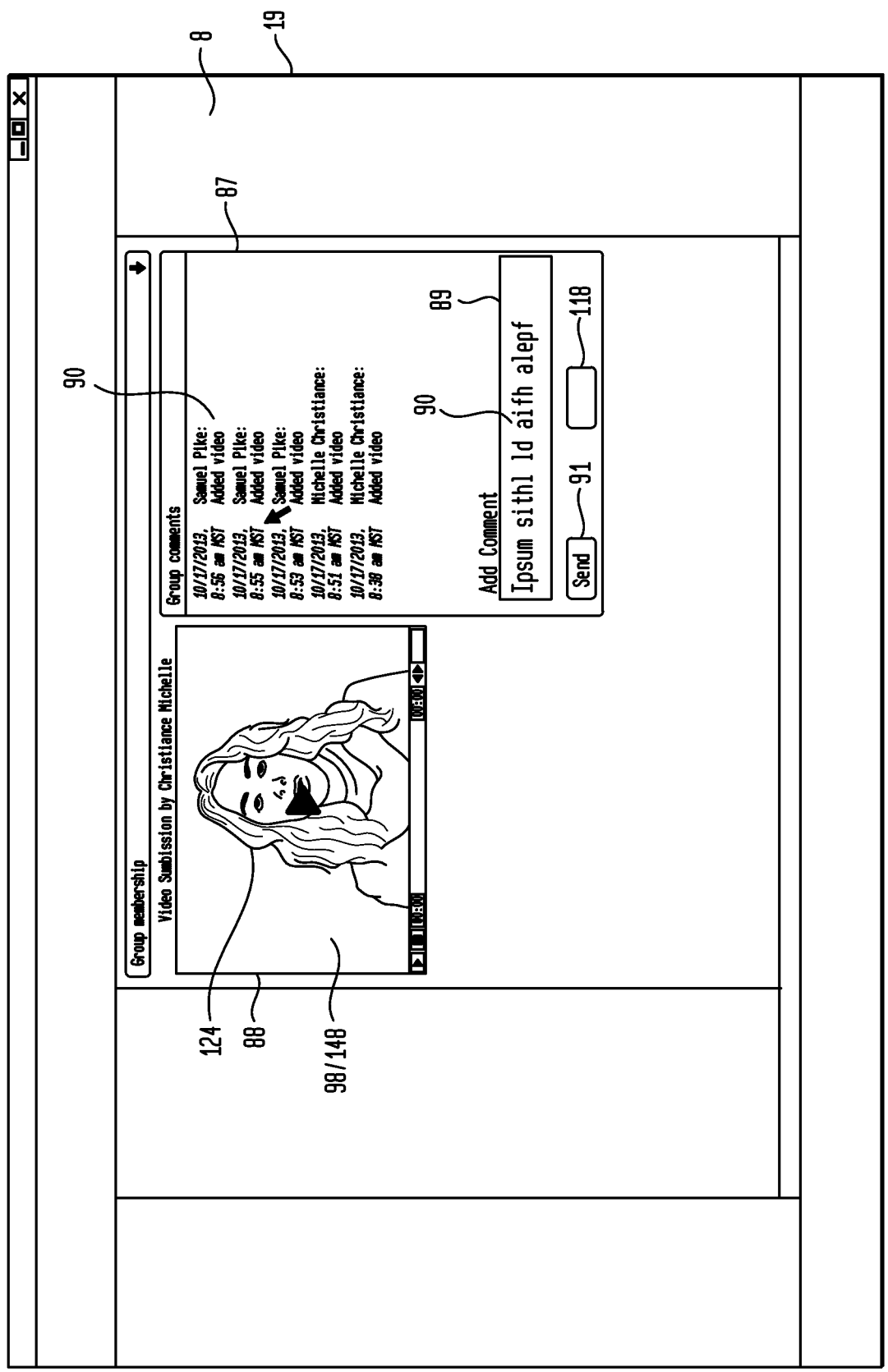

FIG. 22 shows a particular embodiment of a graphical user interface which concurrently displays a video image display area which allows play back of the combined video file a synchronous video communication by client user interaction and further includes an annotation display area which by client user interaction allows entry of one more annotations in synchronized time relation the synchronous video communication.

V. DETAILED DESCRIPTION OF THE INVENTION

Figure 1:
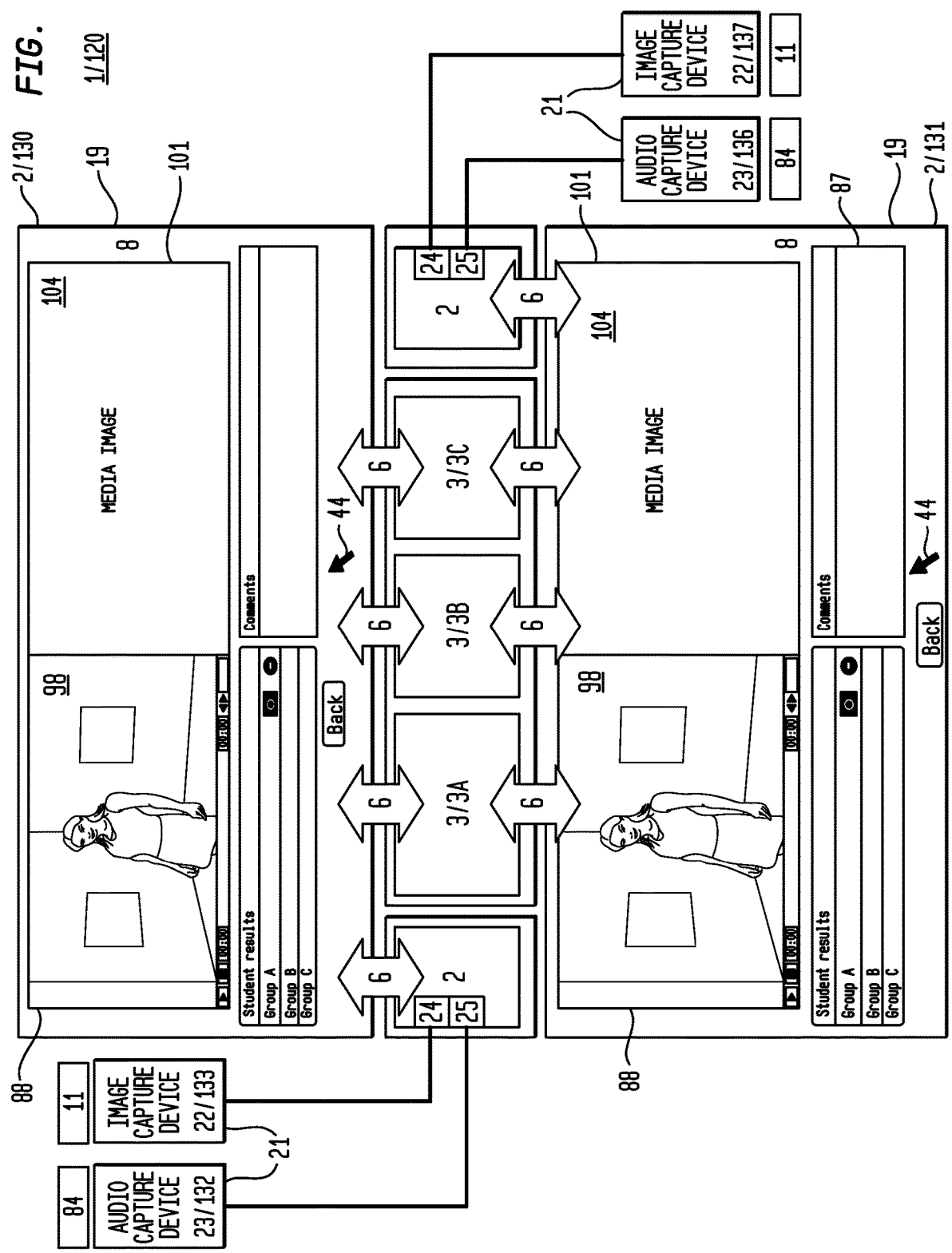
FIG. 1 is a block diagram of a particular embodiment of an inventive computer-implemented group distance learning system.
Figure 2:
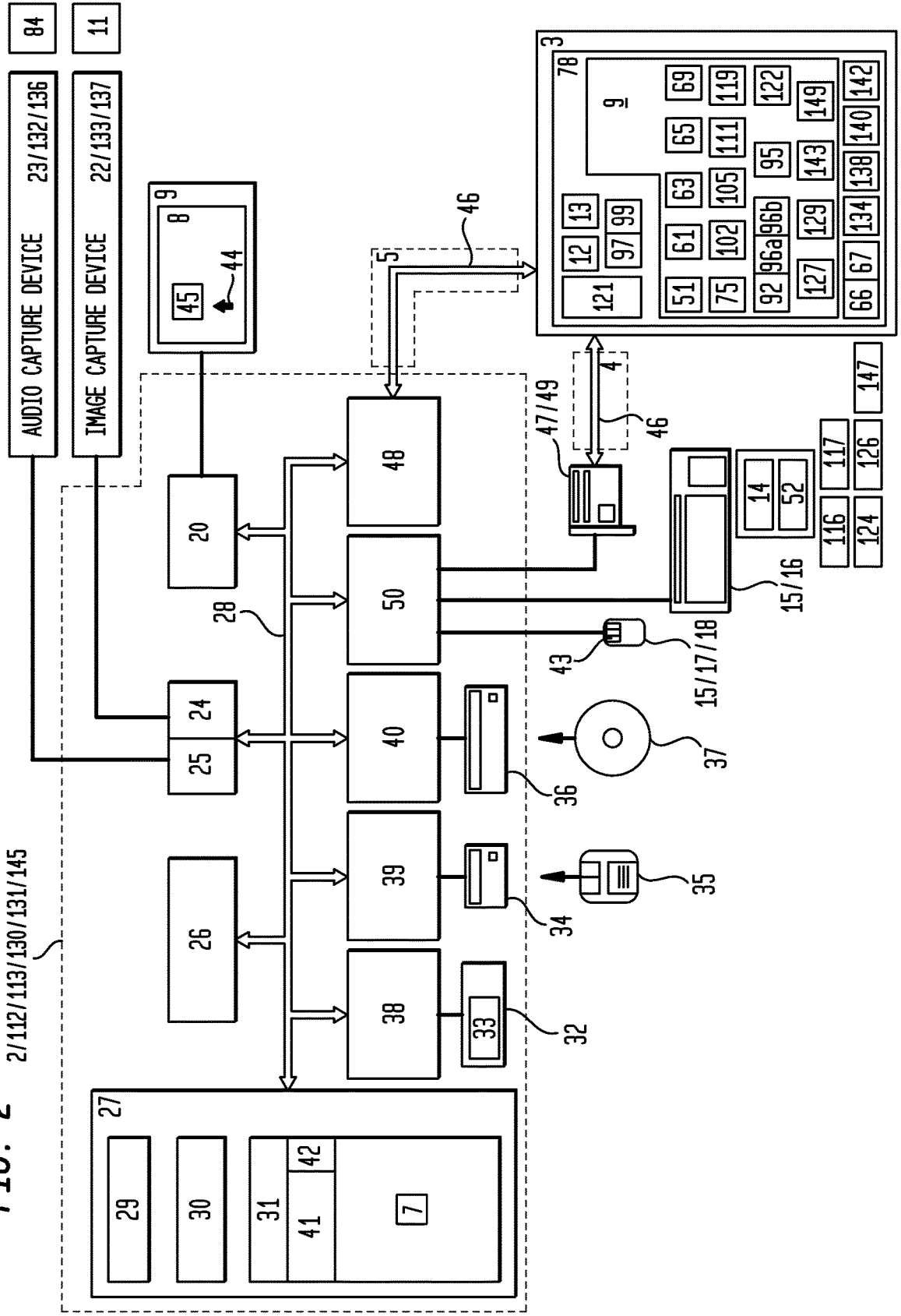
FIG. 2 is a block diagram of an illustrative computer means, network means and computer readable medium which provides computer-executable instructions to provide an embodiment of the inventive computer-implemented group distance learning system of FIG. 1.

Now referring primarily to FIGS. 1 and 2, which generally illustrate computer elements, certain network elements, computer readable media, and a computer program which can be utilized to practice embodiments of the inventive collaborative group distance learning system (1). It is not intended that embodiments of the invention be practiced in only wide area computing environments or only in local computing environments, but rather the invention can be practiced in local computing environments or in distributed computing environments where functions or tasks are performed by remote processing devices that are linked through a communications network. In a distributed computing environment, program modules may be located in both a local or in a remote memory storage device(s) or device elements.

Also while particular embodiments of the invention are described in the general context of computer-executable instructions such as a computer program (9) (also referred to as a "computer code") and modules which utilize routines, programs, objects, components, data structures, or the like, to perform particular functions or tasks or implement particular abstract data types, or the like, being executed by the computer elements and network elements, it is not intended that any embodiments of the invention be limited to a particular set of computer-executable instructions or protocols.

One or more client computers (2) (also referred to as "client computer") can each be configured to connect with one or more server computers (3) (also referred to as a "server") through one or more wide area networks (4) (also referred to as a "WAN"), such as the Internet, or one or more local area networks (5) (also referred to as a "LAN") to transfer digital data (6). Digital data (6) for the purposes of this invention can be quantities, characters, or symbols on which operations are performed by a computer, being stored and transmitted in the form of electrical signals and recorded on magnetic, optical, or mechanical recording media. The client computer (2) can, as to particular embodiments, take the form of a limited-capability computer designed specifically for navigation of a WAN (4) such as the Internet. However, the invention is not so limited and the client computer (2) can be as non-limiting examples: set-top boxes, intelligent televisions connected to receive data through an entertainment medium such as a cable television network or a digital satellite broadcast, hand-held devices such as smart phones, slate or pad computers, personal digital assistants or camera/cell phones, or multiprocessor systems, microprocessor-based or programmable consumer electronics, network personal computers, minicomputers, mainframe computers, or the like.

The client computer (2) can include an Internet browser (7) (also referred to as a "browser") such as Microsoft's INTERNET EXPLORER, GOOGLE CHROME, MOZILLA, FIREFOX, or the like, which functions to download and render multimedia content that is formatted in "hypertext markup language" (HTML). In this environment, a first server computer (3A) might be programmed to implement the most significant portions of a graphical user interface (8) which can include one or a plurality of screen displays generated by execution of the computer program (9), whether in whole or in part. As to these embodiments, a computer program (9) which implements the graphical user interface (8) can be resident in the first server computer (3A) (as shown in the example of FIG. 1) and the one or more client computers (2) can use the browser (7) to display downloaded content and to relay user inputs (10) back to the first server computer (3A). The first server computer (3A) can respond by formatting new screen displays of the graphical user interface (8) and downloading them for display on the client computer (2).

In other embodiments, the server computer (3) can be used primarily as a source of digital data (6), with primary responsibility for implementing the graphical user interface (8) being placed upon one or more client computers (2). As to these embodiments, each of the one or more client computers (2) can run the appropriate portions of the computer program (9) implementing the graphical user interface (8).

An exemplary embodiment of the collaborative group video production system (1) includes a first server computer (3A) which can be used primarily to store and serve the corresponding portions of the computer program (9) to the one or more client computers (2) with the primary responsibility for implementing the graphical user interface (8) being placed upon each of the one or more client computers (2). Each of the one or more client computers (2) execute or run the appropriate portions of the computer program (9) to implement the graphical user interface (8). The second server computer (3B) can be used primarily to record video images (11) (such as streaming video, progressive video, or the like), convert the video images (11) to one or more corresponding video files (12) in the appropriate format (such as video file formats), and transfer the files to a third server computer (3C). The third server computer (3C) can receive, store and retrieve a plurality of video files (12) and a plurality of media files (13).

Understandably, a lesser or greater number of server computers (3) can be utilized to implement embodiments of the collaborative group distance learning system (1) by serving requested portions of the computer program (9) to one or more server databases for retrievable storage of video files (12), media files (13), and other digital data (6) in a common format which can be requested, whether independently or concurrently, by one or more client computers (2).

A client user (14) may enter commands and information into a corresponding one or more client computers (2) through input devices (15) such as a keyboard (16) or a pointing device (17) such as a mouse (18); however, any method or device that converts user action into commands and information can be utilized including, but not limited to: a microphone, joystick, game pad, touch screen, or the like. Each client computer (2) can further include a display surface (19) coupled to a display interface (20) (such as a video adapter). A graphical user interface (8) can be displayed in whole or in part on the display surface (19) by execution of the computer program (9). In addition, each client computer (2) can further include peripheral input devices (21) such as image capture device (22), as illustrative examples: a camera, a video camera, a web camera, a mobile phone camera, a video phone, or the like; and an audio capture device (23), as illustrative examples: a microphone, a speaker phone, a computer microphone, or the like. The audio capture device (23) can be provided separately from or integral with the image capture device (22). The image capture device (22) and the audio capture device (23) can be connected to the client computer (2) by an image capture interface (24) and an audio capture interface (25).

Now referring primarily to FIG. 2, as an illustrative example, a client computer (2) (encompassed by broken line) can include a processor (26), a memory element (27), and a bus (28) which operably couples components of the client computer (2), including communication between the processor (26) and the memory element (27). The processor (26) can be configured as one central-processing unit (CPU), or a plurality of processors which operate in parallel to process digital data (6). The bus (28) can be any of several types of bus configurations including a memory bus or memory controller, a peripheral bus, and a local bus using any of a variety of bus architectures. The memory element (27) can without limitation be a read only memory (ROM) (29) or a random access memory (RAM) (30), or both. A basic input/output system (BIOS) (31), containing routines that assist transfer of digital data (6) between the components of the client computer (2), such as during start-up, can be stored in ROM (29). The client computer (2) can further include a hard disk drive (32) for reading from and writing to a hard disk (33), a magnetic disk drive (34) for reading from or writing to a removable magnetic disk (35), and an optical disk drive (36) for reading from or writing to a removable optical disk (37) such as a CD ROM or other optical media. The hard disk drive (32), magnetic disk drive (34), and optical disk drive (36) can be connected to the bus (28) by a hard disk drive interface (38), a magnetic disk drive interface (39), and an optical disk drive interface (40), respectively. The drives and their associated computer-readable media provide nonvolatile storage of the computer program (9), computer-readable instructions, data structures, program modules and other digital data (6) for the client computer (2). It can be appreciated by those skilled in the art that any type of computer-readable media that can store data that is accessible by a computer, such as magnetic cassettes, flash memory cards, digital video disks, Bernoulli cartridges, random access memories (RAMs), read only memories (ROMs), and the like, may be used in a variety of operating environments. A number of program modules may be stored on the hard disk (33), magnetic disk (35), optical disk (37), ROM (29), or RAM (30), including an operating system (41), one or a plurality of application programs (42) and without limitation the computer program (9) (to the extent not stored in a server memory element (78) of a server computer (3)(3A)(3B)(3C)) which implements the graphical user interface (8), or other program interfaces.

A "click event" (also referred to as "user interaction") occurs when a client user (14) activates a function of the computer program (9) through the use of a command, for example, user interaction of pressing or releasing a left mouse button (43) while a pointer (44) is located over a control icon (45) (or other interactive field which activates a function of the computer program (9)) displayed in a graphical user interface (8). However, it is not intended that a "click event" be so limited, rather, a "click event" is intended to broadly encompass any client user (14) interaction or command by the client user (14) through which a function of the computer program (9) (or other program, application, module or the like) can be activated or performed, whether through selection of one or a plurality of control element(s) (45) or entry of data into fields, voice command, keyboard stroke, mouse button, or otherwise. It is further intended that the control icon (45) can be configured or displayed in any form which by client user (14) interaction can activate a function of the computer program (9) including, as illustrative examples: a bullet, a point, a circle, a triangle, a square, a polygon (or other geometric configurations or combinations or permutations thereof), file identifiers, or as fields or boundary elements, or as fields in which addresses such as a street address, zip code, county code, or natural area code, or inputting a latitude/longitude or projected coordinate X and Y, annotations, or other notation, script or character, or the like, can be entered manually or by operation of the computer program (9), or a portion or element thereof.

The one or more client computers (2) can operate in a networked environment using one or more logical connections (46) to transfer digital data (6) between the client computer (2) and one or more server computers (3)(3A)(3B)(3C). These logical connections (46) are achieved by one or more communications devices (47) coupled to or as a part of the client computer (2); however, the invention is not limited to a particular type of communications device (47). The logical connections (46) depicted in FIG. 2 can include a LAN (5) or WAN (4). Such networking environments are commonplace in offices, enterprise-wide computer networks, intranets, wireless networks, global satellite networks, cellular phone networks and the Internet.

When used in a LAN-networking environment, the client computer (2) can be connected to the LAN (5) through a network interface (48), which is one type of communications device (47). When used in a WAN-networking environment, the client computer (2) typically, but not necessarily, includes a modem (49), a type of communications device (47), or any other type of communications device for establishing communications over the WAN (4). The modem (49), which may be internal or external, can be connected to the bus (28) via a serial port interface (50). In a networked environment, modules or elements of the computer program (9) depicted relative to the client computer (2), or portions thereof, may be stored in one or more server computers (3)(3A)(3B)(3C), as above described. It is appreciated that the network connections shown are exemplary and other computer elements and communications devices for establishing a communications link between the client computer (2) and a server computer (3) can be used.

Now referring again primarily to FIGS. 1 and 2, the client computer (2) can encompass one client computer (2) or can encompass a plurality of client computers (2) each of which can be operated by a client user (14) which can be one person or a plurality of persons whether individually, serially or as a group. The client user (14) can access the computer program (9) through use of a computer program access element including the portion that implements the graphical user interface (8) to retrieve video files (12), media files (13) and other digital data (6) from the one or more server computers (3)(3A)(3B)(3C) in a common format for display in the graphical user interface (8) on the display surface (19) of the client computer (2).

Figure 3:
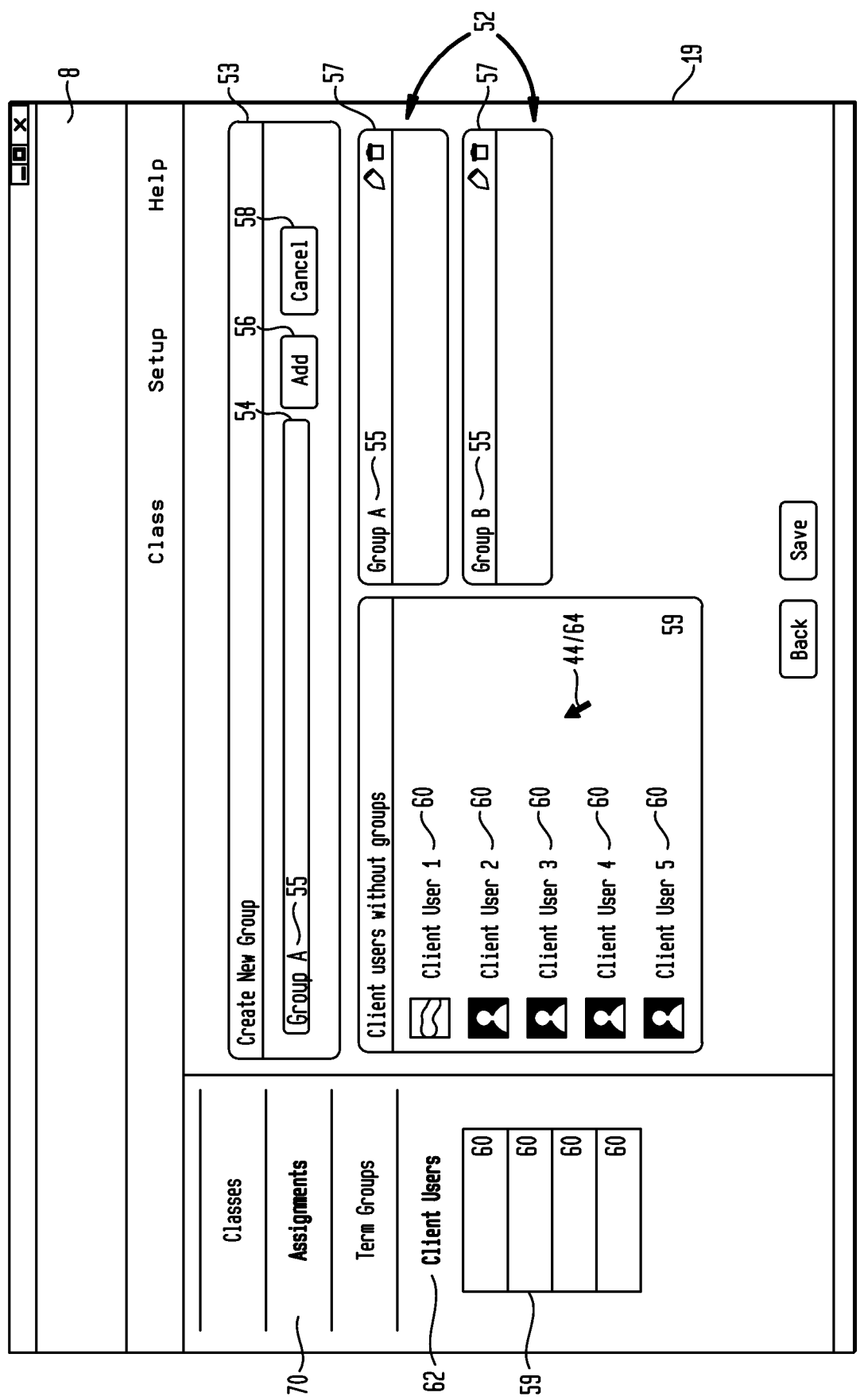
FIG. 3 shows a particular embodiment of a graphical user interface which by click event allows a plurality of client users to be allocated into one more client user groups.

Now referring primarily to FIG. 3, the server computer (3) can serve the computer program (9) including a group creation module (51) (as shown in the example of FIG. 2) executable to display a graphical user interface (8) on the display surface (19) of one or a plurality of client computers (2) to facilitate allocation of a plurality of client users (14) into one or a plurality of client user groups (52). In part, the graphical user interface (8) includes a group creation area (53) having a group creation identifier field (54) in which a group identifier (55) (for example "Group A") can be entered by user interaction. A group identifier creation element (56) (for example, "Add") can by click event execute a portion of the group creation module (51) to display a group area (57) associated with the group identifier (55) prior entered into the group creation identifier field (54) (for example, the group areas (57) associated with the identifiers "Group A" and "Group B"). Similarly, a group identifier removal icon (58) (for example, "Cancel") can by click event execute a portion of the group creation module (51) to remove a group area (57) associated with a group identifier (55) prior entered into the group creation identifier field (54). The group creation module (51) can further be executed to display a client user identifier area (59) which can contain a plurality of client user identifiers (60) representing a plurality of client users (14) to be allocated to one or between a plurality of client user groups (52).

Again referring primarily to FIG. 3, as to particular embodiments, the computer program (9) can further include a client user identifier selection module (61) (as shown in the example of FIG. 2) which can function by click event on a client user element (62) (for example "Client Users" as shown in FIG. 3) to display a client user list (or similar feature which displays a plurality of client user identifiers (60) which by click event can be selected to be displayed in a client user identifier area (59).

Figure 4:
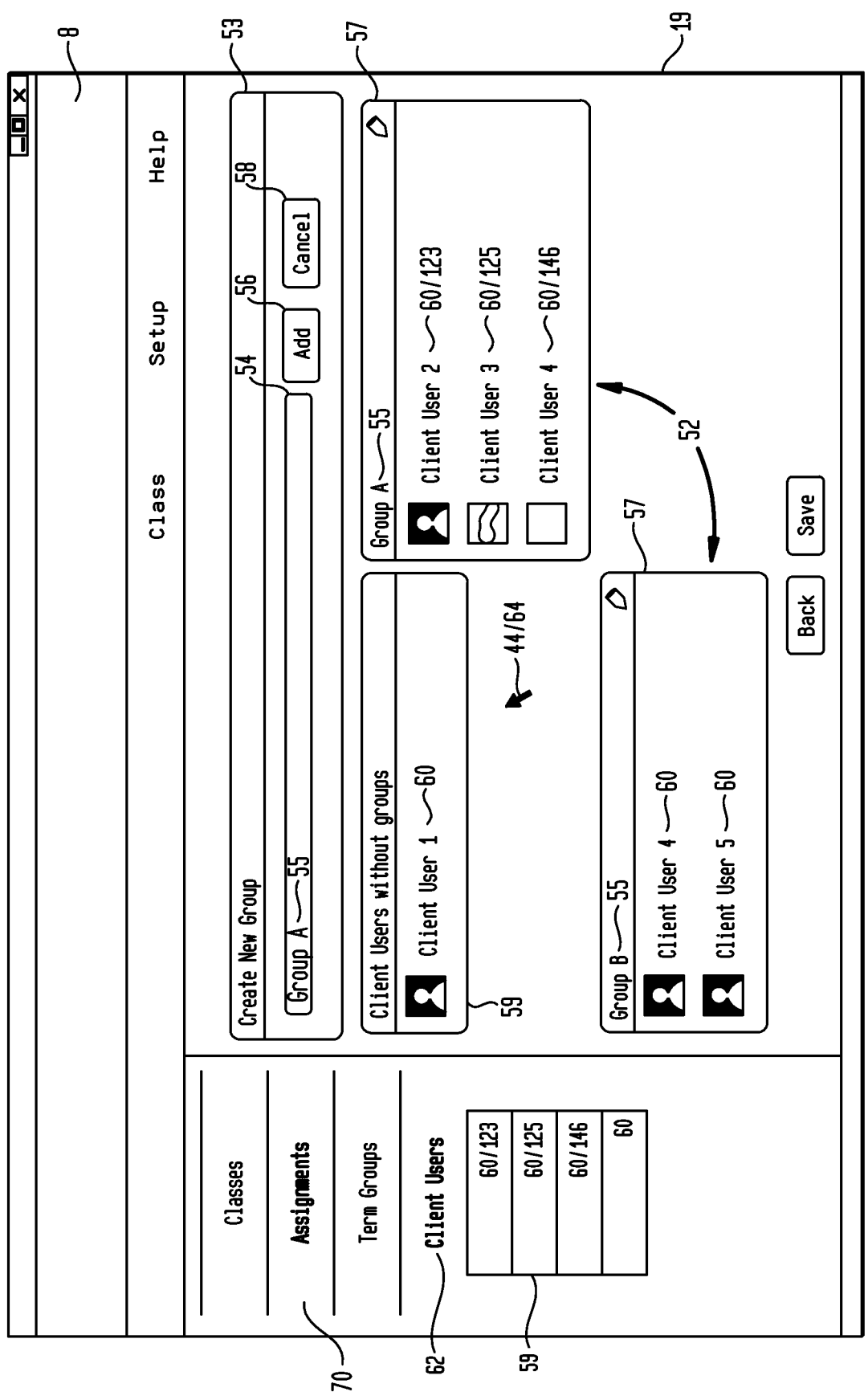
FIG. 4 shows a particular embodiment of the graphical user interface of FIG. 3 with a plurality of client users allocated into a plurality of client user groups.

Now referring primarily to FIGS. 3 and 4, the computer program (9) can further include a client user identifier allocation module (63) (as shown in FIG. 2) which functions to display a client user identifier allocator icon (64) which by click event allows movement of one or more client user identifiers (60) from the client user identifier area (59) into one of the plurality of group areas (57) displayed on the display surface (19). As to particular embodiments, the client user identifier allocator icon (64) can include a pointer (44) which by click event can discretely drag and drop each of the plurality of client user identifiers (60) from the client user identifier area (59) into one of the plurality of group areas (57).

The computer program (9) can be further executed to operate a client user identifier coupling module (65) (as shown for example in FIG. 2) which couples the plurality of client user identifiers (60) in a group area (57) to a group address (66) containing the plurality of client user addresses (67) associated with the client user identifiers (60). Thereafter, each of the plurality of client users (14) in a client user group (52) collaborate through use of a common graphical user interface (8) discrete from the graphical user interface (8) in use by any client user group (52).

Figure 5:
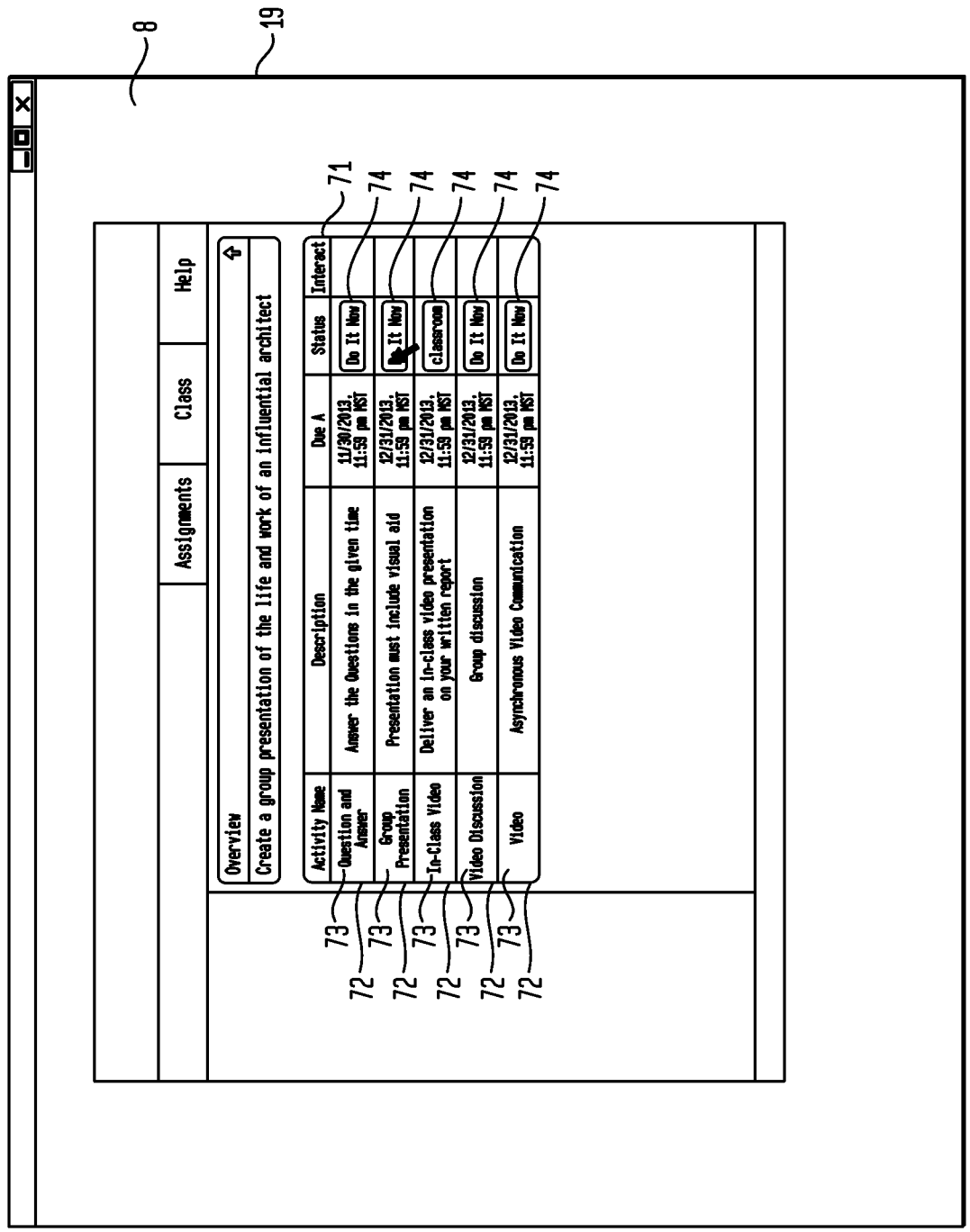
FIG. 5 shows a particular embodiment of a graphical user interface including an interactive group assignment area which by click event displays a graphical user interface utilized by a client user group to complete an assignment activity.

Now referring primarily to FIG. 5, the computer program (9) can further include an assignment module (69) executed by click event of an assignment icon (70) (as shown in the example of FIG. 4) which functions to display a group assignment area (71) on the display surface (19). The group assignment area (71) can include one or more assignment fields (72) each including an assignment activity (73). Each assignment activity (73) can further include an assignment activity access icon (74) which by click event displays the graphical user interface (8) utilized by the client user group (52) to complete the assignment activity (73). As to particular embodiments, the assignment activity (73) can include (whether in whole or in part) collaborative group video production or an asynchronous video communication (128), as further described below.

Figure 6:
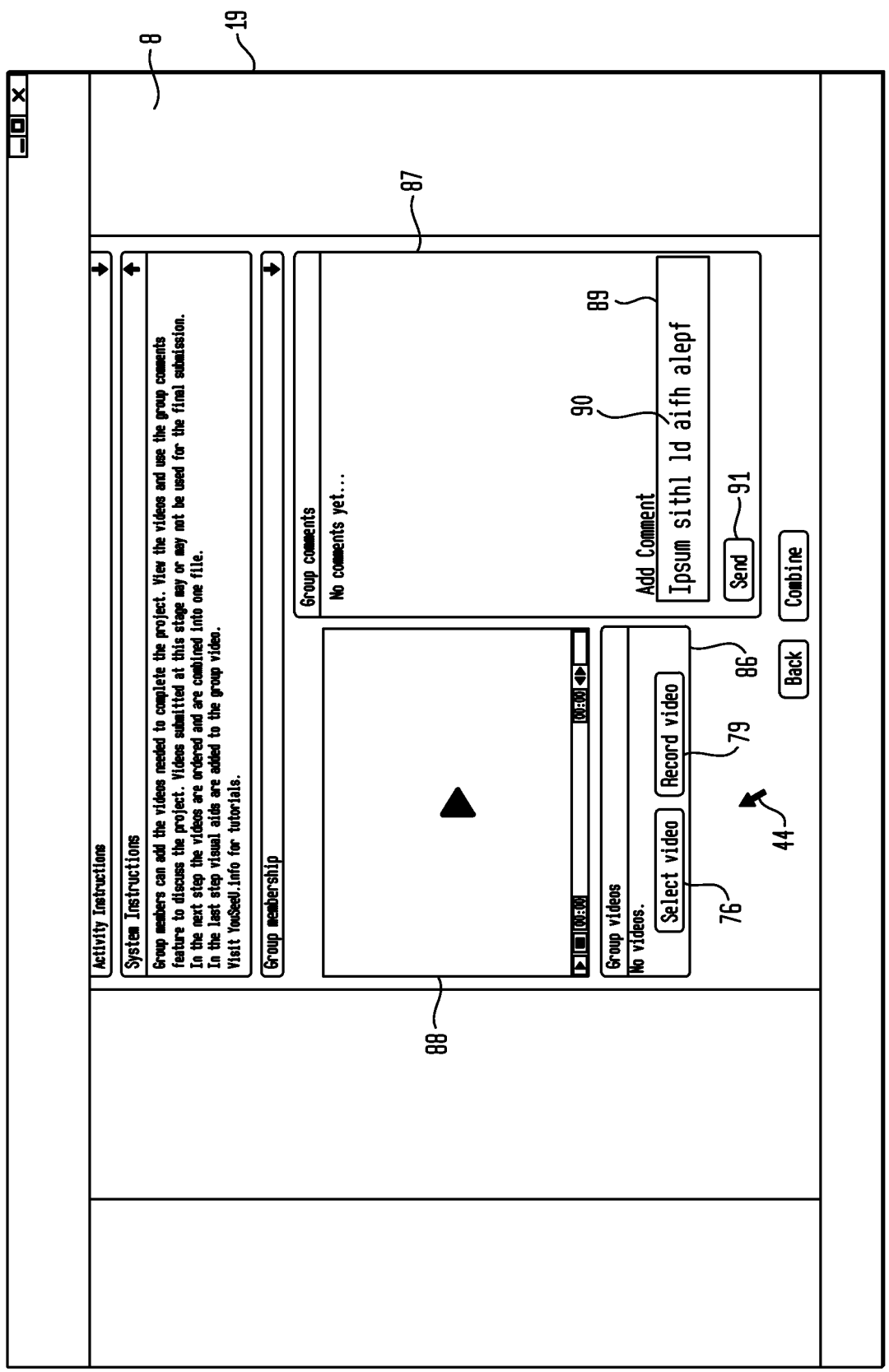
FIG. 6 shows a particular embodiment of a graphical user interface which allows by click event selection of video files for display of the corresponding video file identifiers in a video file identifier display area.
Figure 7:
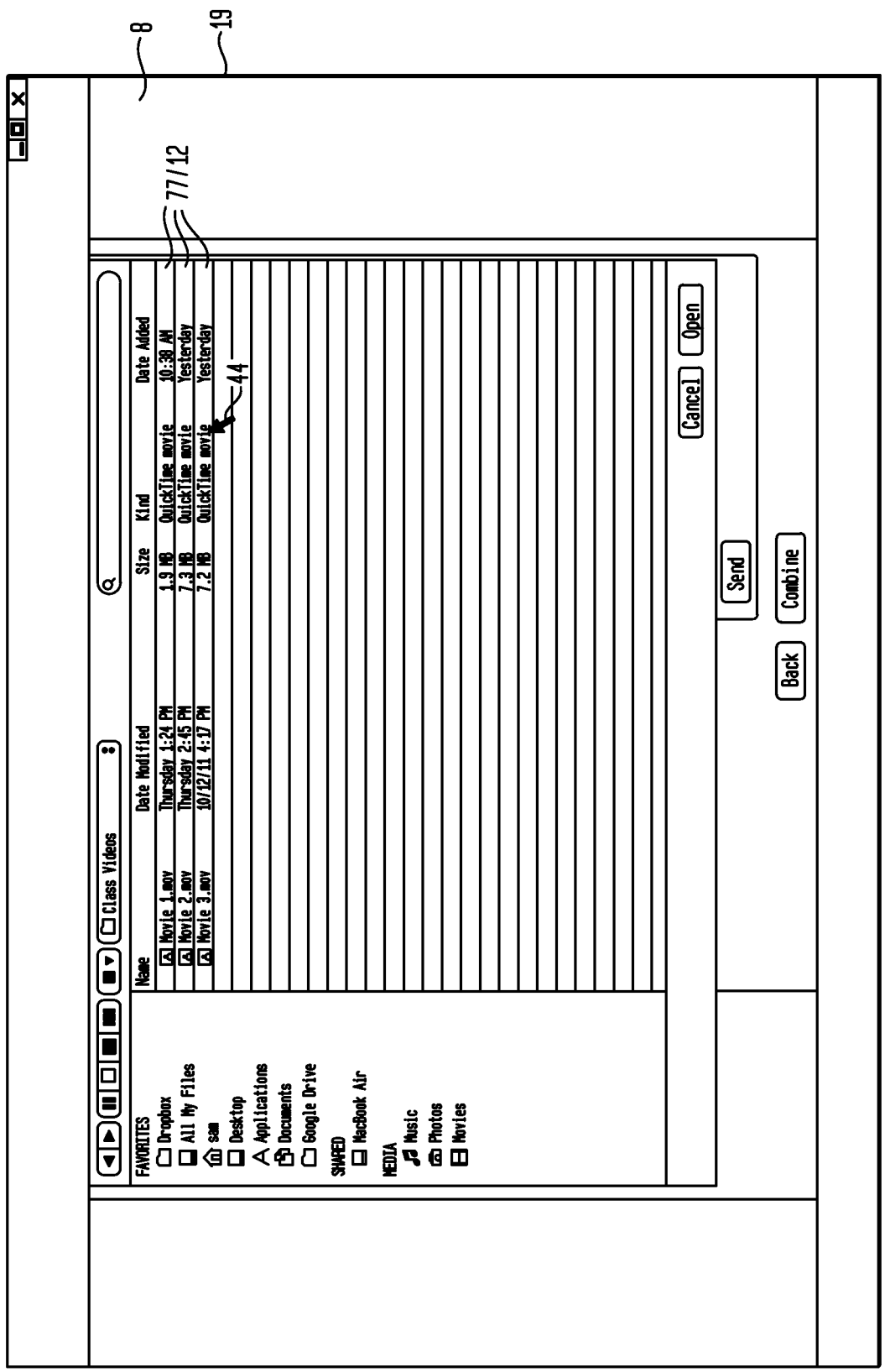
FIG. 7 shows a particular embodiment of a graphical user interface including a drop-down list which allows by click event selection of video files for display of the corresponding video file identifiers in a video file identifier display area.

Now referring primarily to FIGS. 1 and 6 through 10, by click event of the assignment activity access icon (74) a collaborative group video production module (75) functions to display in common a graphical user interface (8) on the display surface (19) of each one of the plurality of client computers (2) associated with a client user (14) in a client user group (52) to facilitate collaborative group video production. The graphical user interface (8) can include a video file selector icon (76) (for example a "Select" button as shown in the example of FIG. 6) which by a click event causes display of a plurality of video file identifiers (77) (shown as a drop down list in the example of FIG. 7) coupled to a corresponding plurality of video files (12) stored in a server memory element (78) or client computer memory element (27) (as shown in the example of FIG. 1). The client user (14) can by click event select one or more of the video file identifiers (77) to correspondingly display the video file identifier (77) in a video file identifier display area (86) (as shown in the example of FIG. 6).

Figure 8:
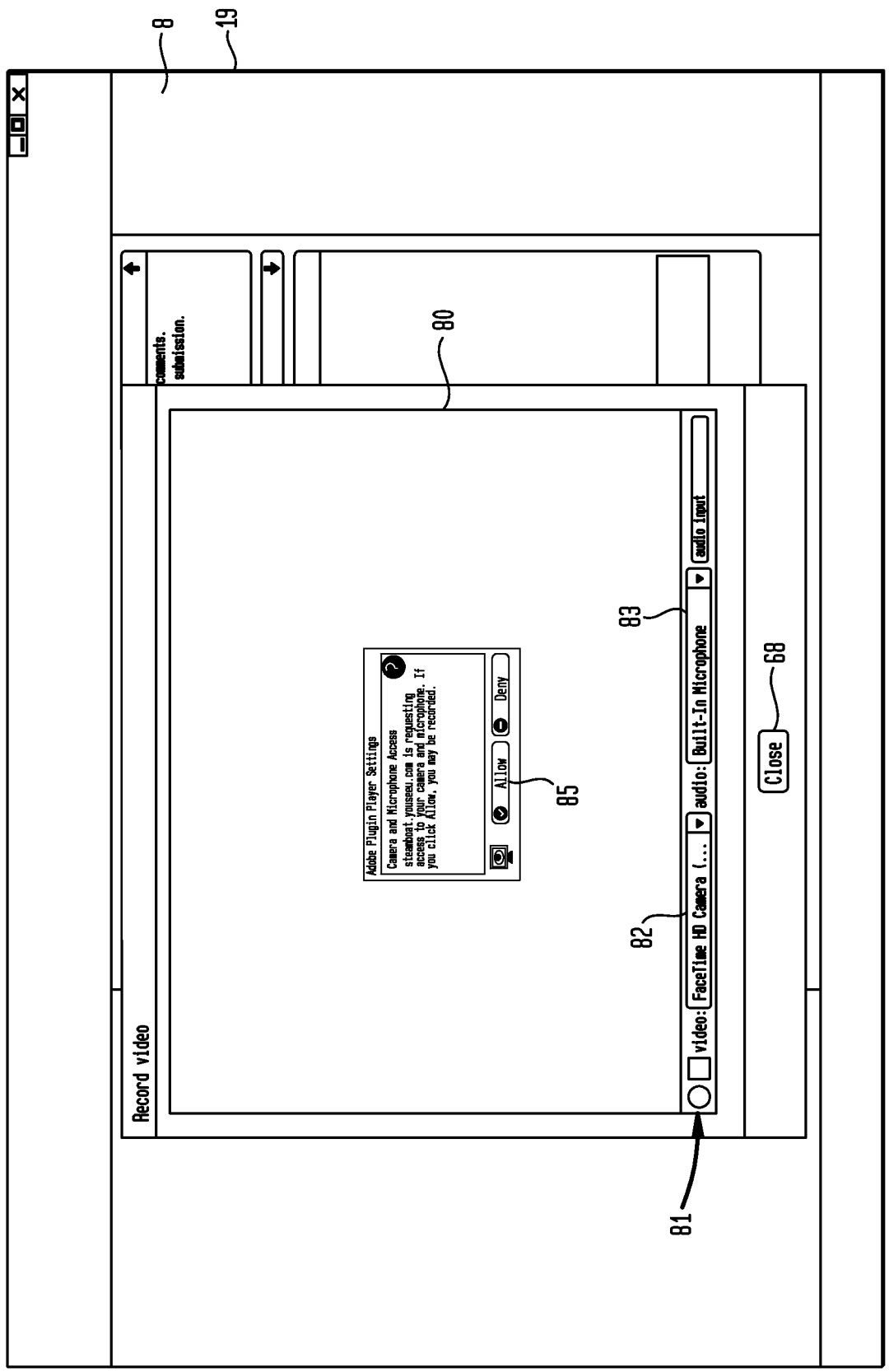
FIG. 8 shows a particular embodiment of a graphical user interface including a video image capture area which by click event allows capture of an image along with associated audio.

The collaborative group video production module (75) can further function to display a video image capture icon (79) (for example a "Record Video" button as shown in FIG. 6) which by click event causes display of a video image capture area (80) (as shown in the example of FIG. 8) including a video image capture controller (81) (as shown in the example of FIG. 8). The video image capture controller (81) can include a video image capture device selector (82) which by click event allows selection of a video image capture device (22) which captures n video image (11) for display in the video image capture area (80). The video image capture device (22) can be selected from a plurality of video image capture devices (22) capable of capturing an image (11), for example: a camera, a video camera, a web camera, a mobile phone camera, a video phone, or the like. The video image capture controller (81) can further include an audio capture device selector (83) which by click event selects an audio capture device (23) which captures audio (84) associated with the video image (11) displayed in the video image capture area (80). The audio capture device (23) can be selected from a plurality of audio capture devices (23) capable of capturing audio (84), for example: a microphone, a speaker phone, a computer microphone, or the like. As shown in the example of FIG. 8, the audio capture device (23) can be separate from or built into the video image capture device (22). Accordingly, selection of the image capture device (22) can correspondingly select the built-in audio capture device (23).

Figure 9:
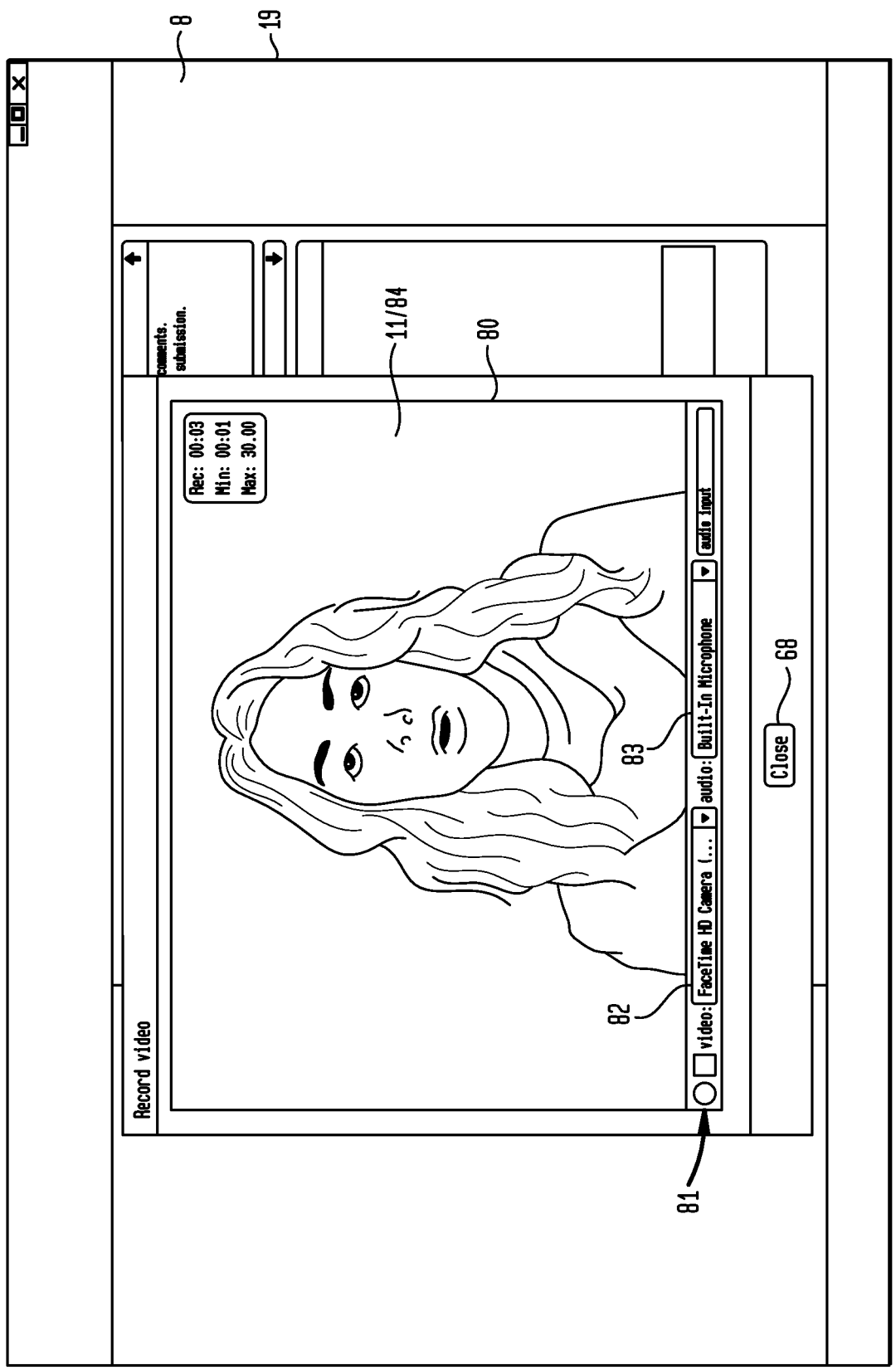
FIG. 9 shows a particular embodiment of a graphical user interface including a video image capture area shown in FIG. 8 capturing an image and associated audio.
Figure 10:
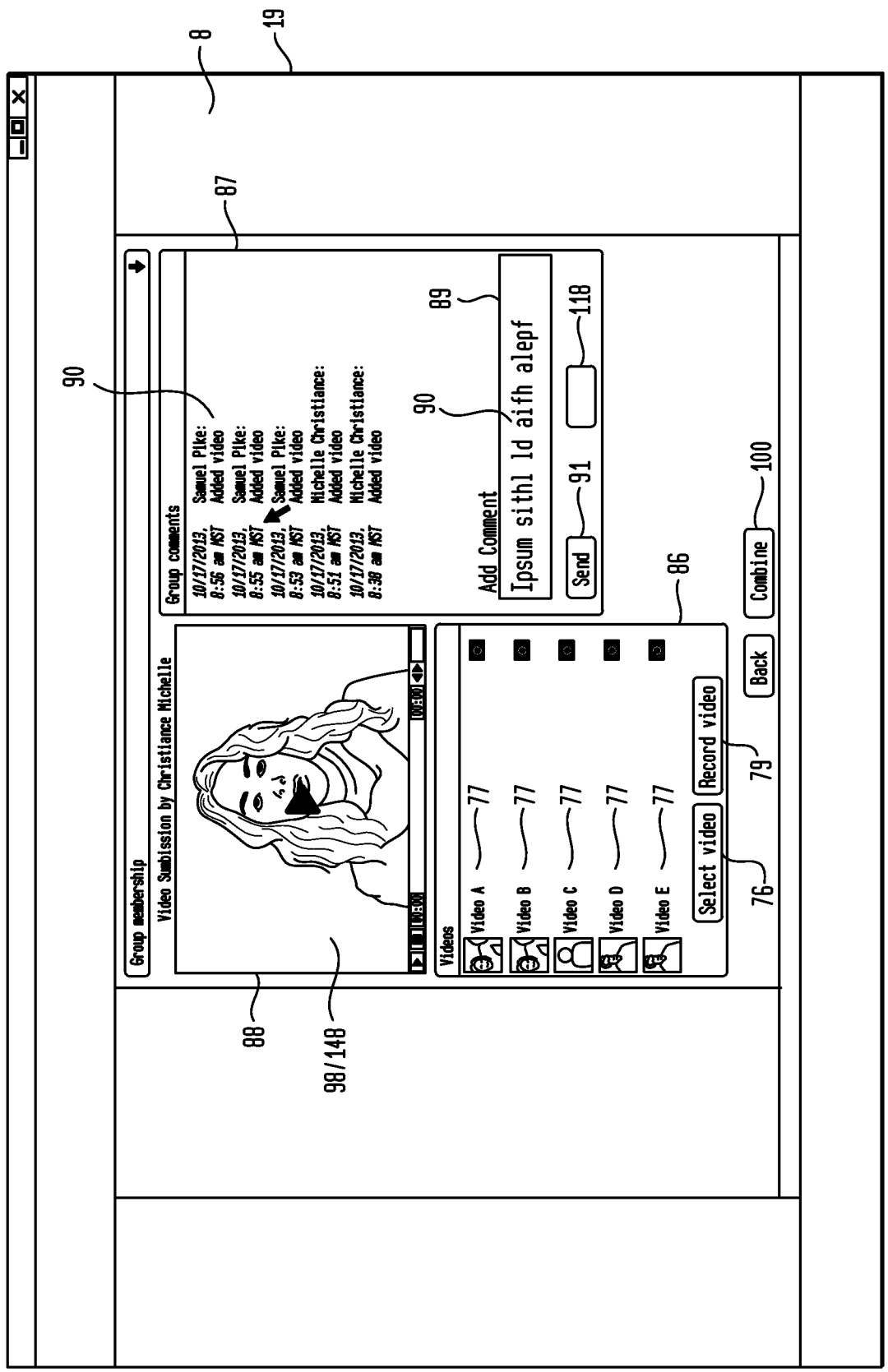
FIG. 10 shows a particular embodiment of a graphical user interface of FIG. 6 which further includes an annotation display area which by click event allows entry of one more annotations.

The collaborative group video production module (75) can further function to display a image-audio capture control icon (85) (for example, the "Allow" button shown in FIG. 8) which by click event initiates capture of the image (11) associated with the audio (84) (as shown in the example of FIG. 9) and conversion of the video image (11) and associated audio (84) content into a video file (12). The graphical user interface (8) can further include a submission control element (68) (for example, the "Close" button shown in FIG. 9) which by click event stores the video file (12) in the server memory element (78) as one of a plurality of video files (12) each having a corresponding one of a plurality of video file identifiers (77) which can be selected as above described for inclusion in the video file identifier display area (86) (as shown in the example of FIG. 10).

The collaborative group video production module (75) can be further executed to concurrently display a video image display area (88), a video file identifier display area (86) and an annotation display area (87) on the display surface (19). The annotation display area (87) can further include an annotation field (89) which by click event allows entry of one more annotations (90) into the annotation field (89). The annotation display area (87) can further include an annotation entry icon (91) (shown for example as a "Send" button in the examples of FIGS. 6 and 10) which by click event displays the one or more annotations (90) in the annotation display area (87) on the display surface (19) of all the client computers (2) associated with the group address (66) (as shown in the example of FIG. 10).

Figure 11:
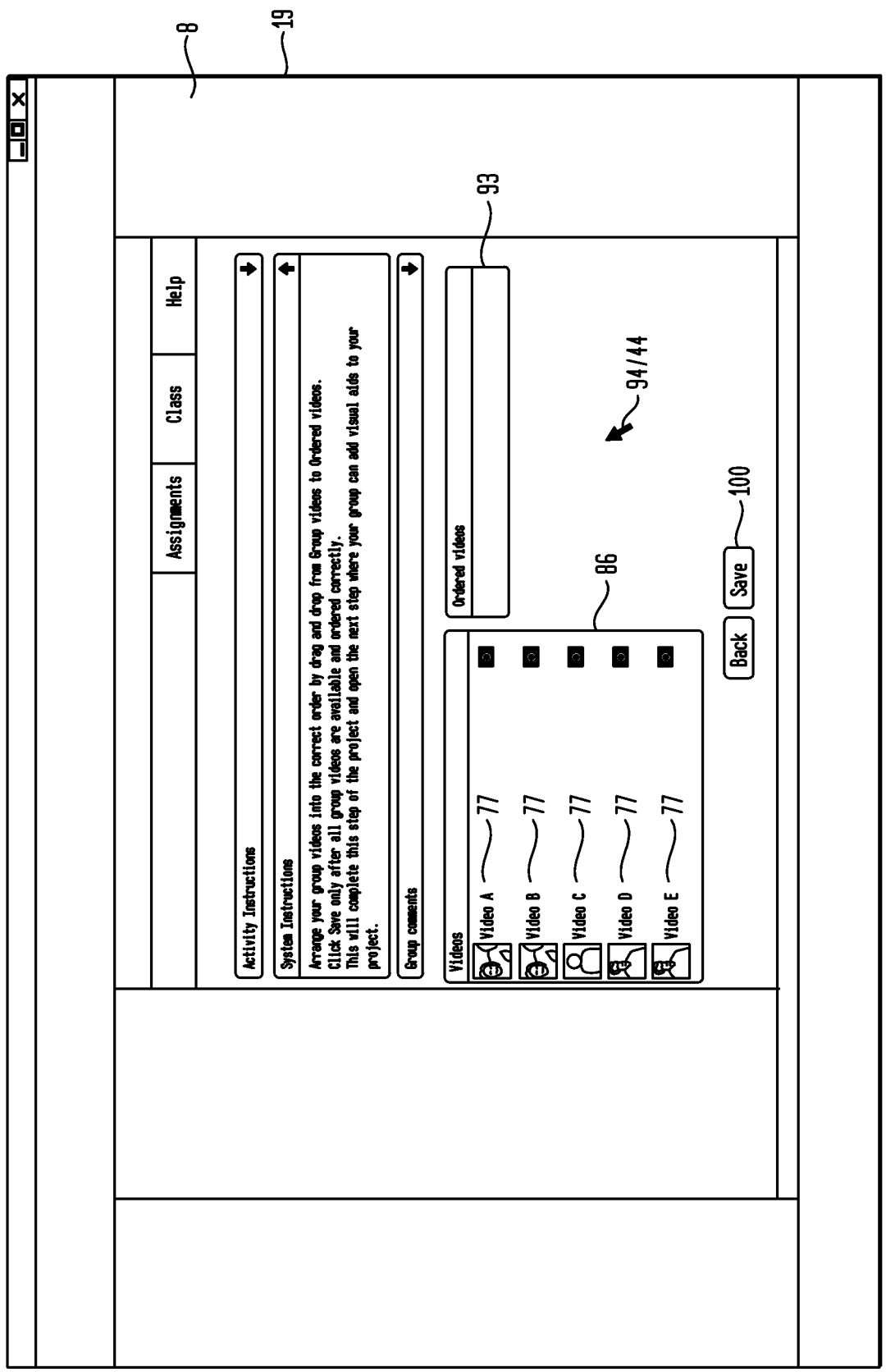
FIG. 11 shows a particular embodiment of a graphical user interface of FIG. 6 which by click event allows a plurality of video identifiers contained in the video file identifier display area to be moved into serial order in a video file identifier serial order display area.
Figure 12:
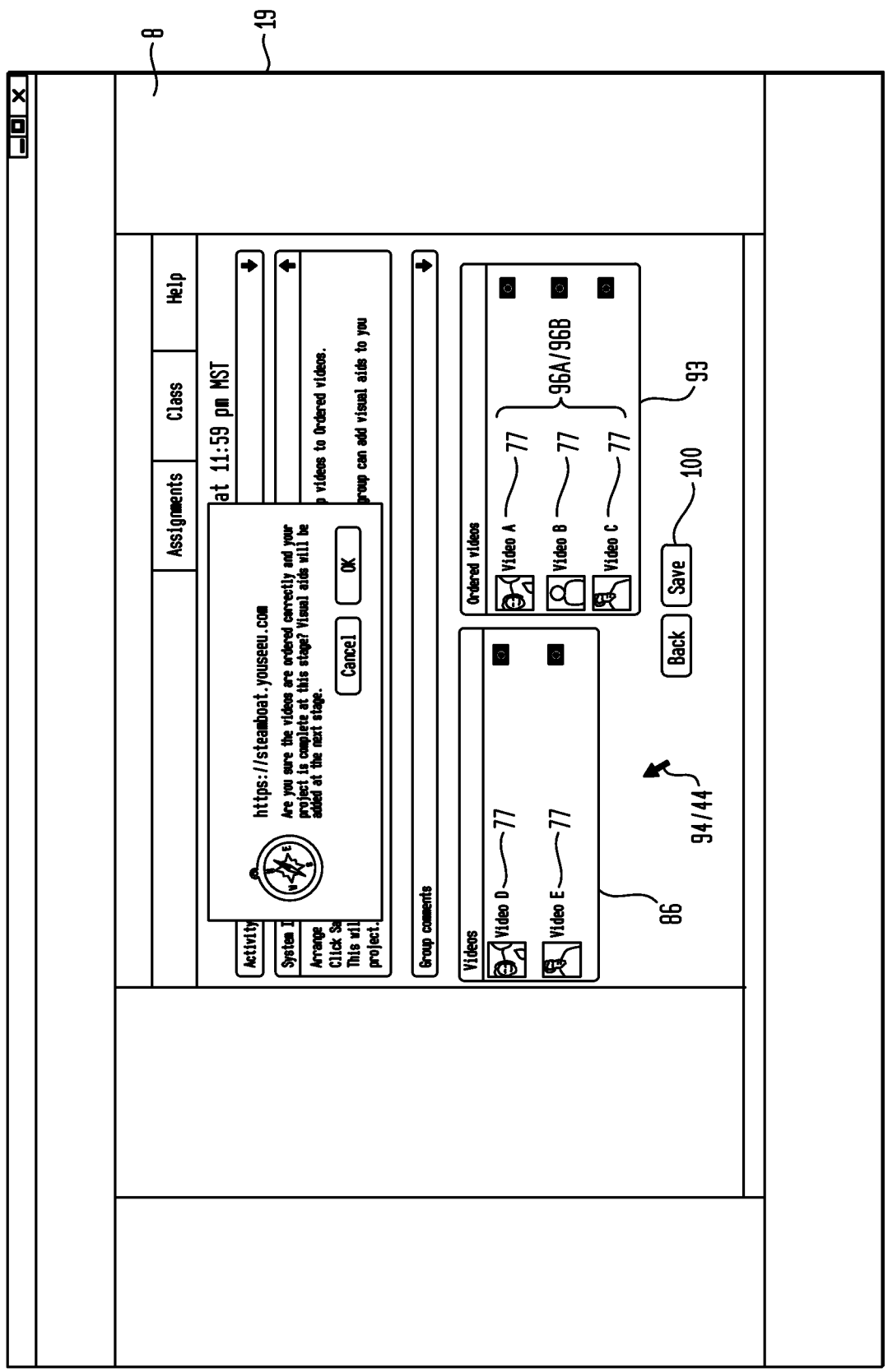
FIG. 12 shows a particular embodiment of a graphical user interface of FIG. 11 in which a plurality of video identifiers contained in the video file identifier display area have been moved into serial order in a video file identifier serial order display area.

Now referring primarily to FIGS. 11 and 12, embodiments of the computer program (9) can include a video file identifier serial order module (92) which functions to concurrently display the video file identifier display area (86) and a video file identifier serial order display area (93) on the display surface (19) of the plurality of client computers (2) associated with a group address (66) along with a video file identifier serial order icon (94) (as shown in the example of FIG. 11). The video file identifier serial order icon (94) can by click event move one or more video file identifiers (77) from the video file identifier display area (86) into a serial order (96A) in the video file identifier serial order display area (93) (as shown in the example of FIG. 12). As one example, the video file identifier serial order icon (94) can be a pointer (44) which by click event drags and drops each of the one or more video file identifiers (77) from the video file identifier display area (86) into the serial order (96A) in the video file identifier serial order display area (93). Similarly, the video file identifier serial order element (94) can by click event move one or more video file identifiers (77) from the video file identifier serial order display area (93) back to the video file identifier display area (86). The video file identifier serial order icon (94) can by click event be further used to move the video file identifiers (77) in a video file identifier serial order display area (93) into any desired serial order (96A). In the example of FIG. 12, the serial order (96A) of the plurality of video file identifiers (77) in the video file identifier serial order display area (93) can be established by positioning the plurality of video file identifiers (77) in consecutive vertical order from the top to the bottom of the video file identifier serial order display area (93); however, the invention is not so limited, and embodiments of a video file identifier serial order module (92) which functions to allow placement of the plurality of video file identifiers (77) in the video file identifier serial order display area (93) in a pre-determined serial order (96A) corresponding to a pre-determined serial play order (96B) is encompassed by the invention (for example the video file identifiers (77) can be serial ordered left to right in a row).

Embodiments of the computer program (9) can further include a video file coupling module (95) which couples the plurality of video files (12) stored in the server memory element (78) in a serial play order (96B) corresponding to the serial order (96A) of the plurality of video file identifiers (77) in the video file identifier serial order display area (93) as a combined video file (97) associated with the client user group (52). The combined video file (97) can be can be played back as a combined video image (98) which includes a continuous playback of the plurality of video files (12) corresponding to the serial order (96A) of the plurality of video file identifiers (77) in the video file identifier serial order display area (93). The combined video file (97) also includes the audio files (99) associated with the combined video file (97). As to particular embodiments, a video file coupling module (95) can be activated by click event of a combined video save icon (100) (for example the "Save" button shown in the example of FIGS. 11 and 12).

Figure 13:
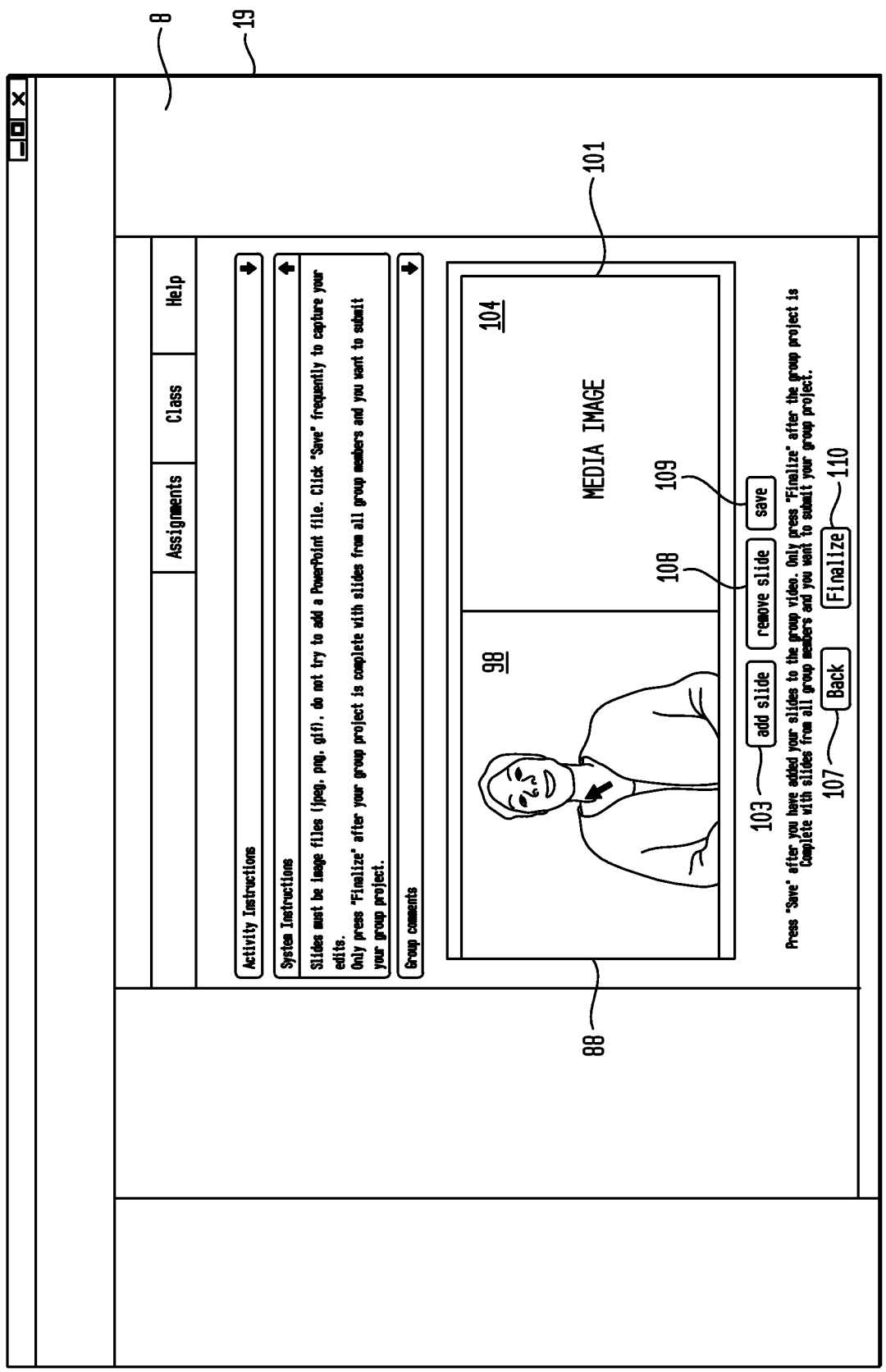
FIG. 13 shows a particular embodiment of a graphical user interface which concurrently displays a video image display area adjacent to a media image display area along with a media file selection element which by click event allows selection of one of a plurality of media files for display as a media image in the media image display area.

Now referring primarily to FIG. 13, as to particular embodiments, the computer program (9) can further include a combined video playback module (102) activated by click event of the combined video save icon (100) which functions to concurrently display a video image display area (88), typically, but not necessarily, adjacent to a media image display area (101) on the display surface (19) of the plurality of client computers (2) of a client user group (52) and to retrieve and playback only the combined video file (97) and audio file (99) associated with the client computers (2) of the client user group (52). The computer program (9) can further include a media image control module (105) (as shown in the example of FIG. 2) which functions to display a media file selection icon (103) which by click event pauses playback of the combined video image (98) in the image display area (88) and allows by click event selection of one or a plurality of media files (13) stored in the server memory element (78) of the server computer (3) for display as a media image (104) in the media image display area (101) on the display surface (19).

Figure 14:
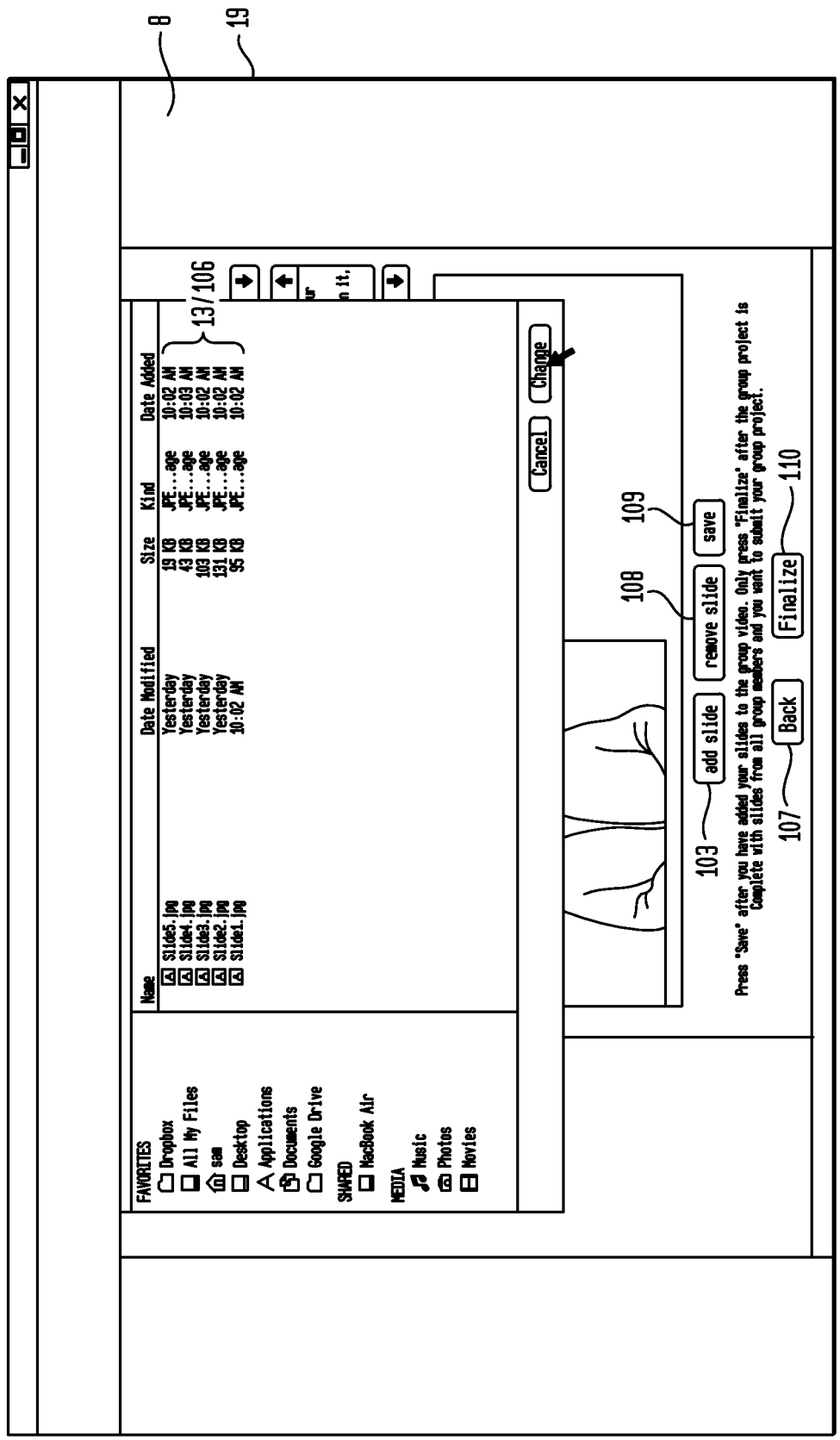
FIG. 14 shows a particular embodiment of a graphical user interface including a drop-down list which allows by click event selection of media files for display of the corresponding media image displayed in the media image display area.
Figure 15:
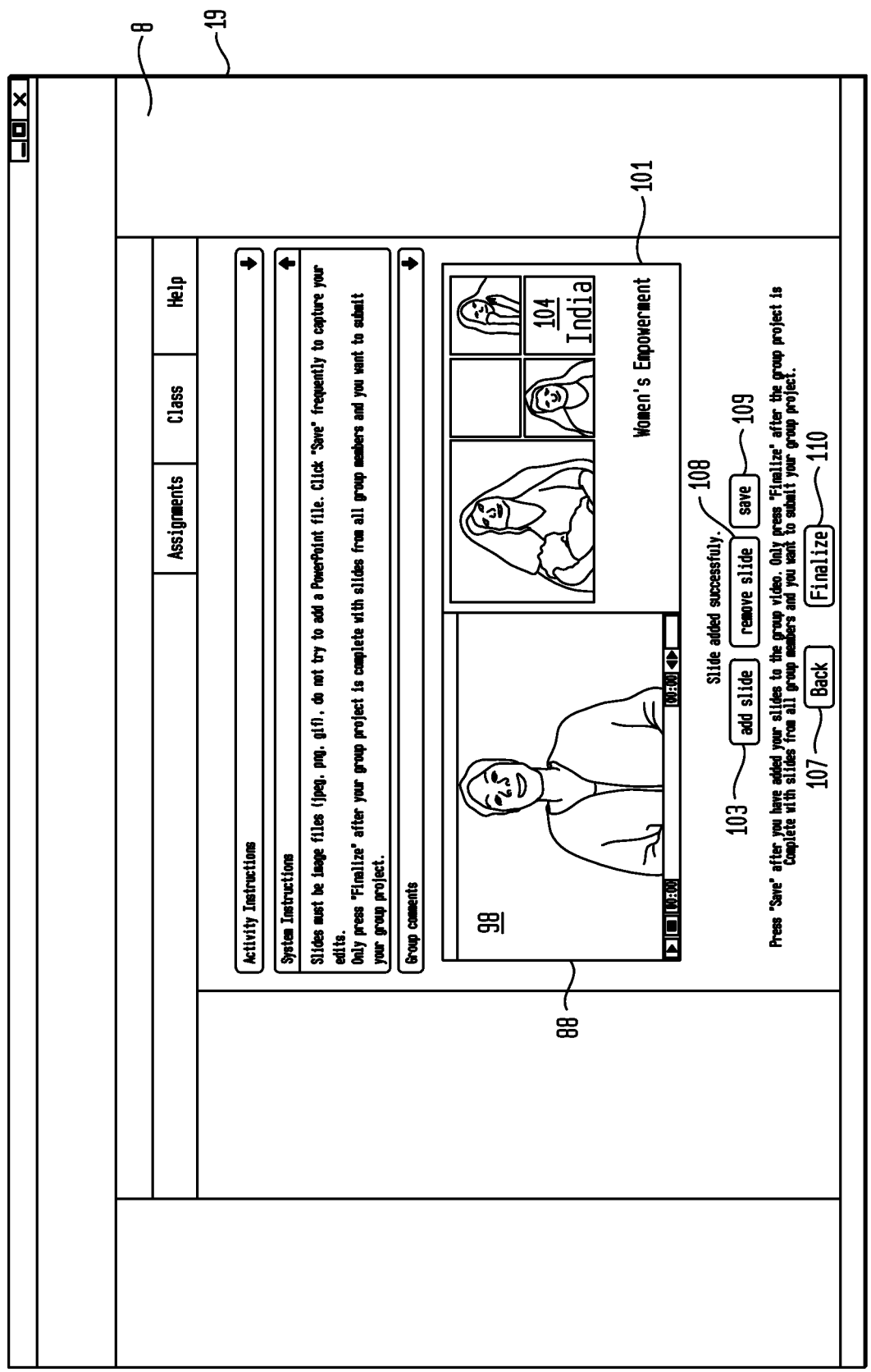
FIG. 15 shows a particular embodiment of a graphical user interface of FIG. 13 including a video image displayed in the video image display area and a media image displayed in the media image display area.

Now referring primarily to FIGS. 14 and 15, particular embodiments the media image control module (105) can function to display a media file selection icon (103) (for example the "Add Slide" button shown in the example of FIG. 13) which by click event pauses playback of the combined video image (98) and displays a plurality of media file identifiers (106) corresponding to the plurality of media files (13) stored in the server memory element (78). A media file identifier (106) can by click event be selected to display the corresponding media image (104) in the media image display area (101) and initiate continued playback of the combined video image (98) in the video image display area (88) (as shown in the example of FIG. 15). The media image control module (105) can further function to display a rewind icon (107) which by click event allows re-presentation of a portion of the combined video image (98) (for example the "Back" button shown in the example of FIG. 13). The media image control module (105) can further function to display a remove media image icon (108) (for example the "Remove Slide" button shown in the example of FIG. 13) which by click event pauses playback of the combined video image (98) and removes the media image (104) displayed in the media image display area (101). As to particular embodiments of the media image control module (105), each client user (14) in a client user group (52) can by click event discrete from any other client user (14) in the client user group (52) add or remove one or more of the plurality of media images (104) in association with the same combined video file (97) and combined video image (98).

Now referring primarily to FIG. 15, the media image control module (105) can further function to display a media image synchronizer icon (109) (for example the "Save" button shown in the example of FIG. 15) which by click event activates the functions of a media image synchronizer module (111) which functions to couple presentation of the media image (104) displayed in the media image display area (101) in synchronized timed relation to presentation of the combined video image (98) in the video image display area (88). A client user (14) within the client user group (52) can by click event activate the media image synchronizer module (111) one or a plurality of times during presentation of the combined video image (98) in the video image display area (88) to correspondingly display a plurality of media images (104) in the media image display area (101) each thereby coupled in synchronized timed relation to the combined video image (98) by operation of the media image synchronizer module (111). The term "synchronized time relation" means for the purpose of this invention that the presentation of the media image (104) (or serial presentation of a plurality of media images (104)) in the media image display area (101) is coordinated in timed relation to the playback of the combined video image (98) in the video image display area (88), and in each subsequent playback of the combined video image (98) in the video image display area (88). The one or more media images (104) can each be time stamped based upon the pause time of the combined video image (98) in the video image display area (88) such that upon subsequent retrieval of the combined video file (97), the media files (13) can be retrieved corresponding to the time stamp such that presentation of the combined video image (98) in the video image display area (88) can be accompanied by presentation of the one or more media images (104) in the media image display area (101) in synchronized timed relation as originally determined by the client user (14) within the client user group (52).

Now referring primarily to FIG. 15, embodiments of the media image control module (105) can further function to display a combined video-media synchronizer icon (110) (for example the "Finalize" button as shown in FIG. 15) which by click event by a client user (14) within the client user group (52) functions to save in the server memory element (78) the combined video file (97) synchronized in timed relation to the plurality of media files (13) added by each client user (14) within the client user group (52).

Figure 16:
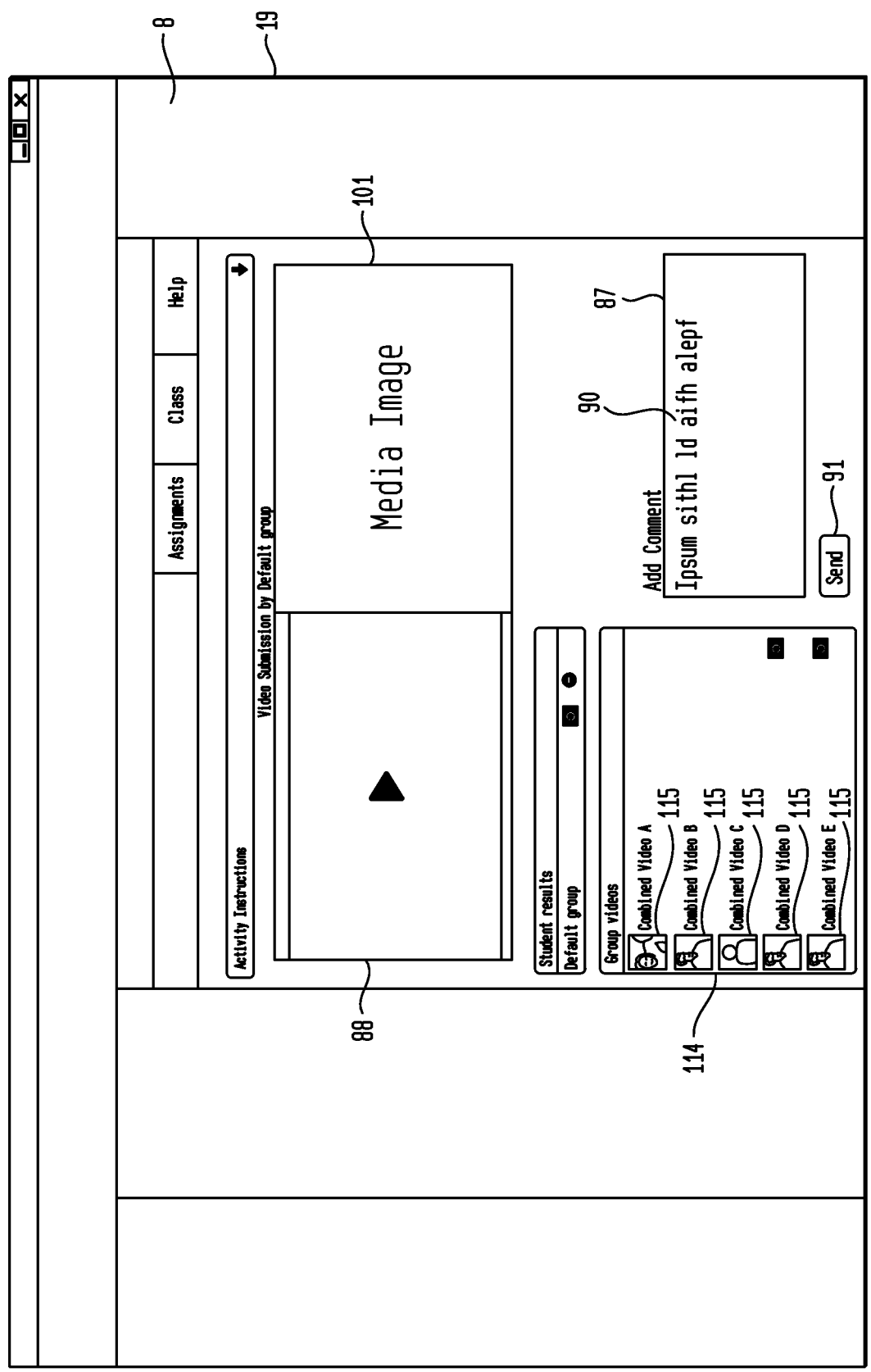
FIG. 16 shows a particular embodiment of a graphical user interface which concurrently displays a video image display area adjacent to a media image display area along with an annotation display area and a combined video identifier display area.

Now referring primarily to FIGS. 16 through 17, the computer program (9) can further include a combined video-media module (119) (as shown in the example of FIG. 2) activated by click event of the combined video-media synchronizer icon (110) which functions to concurrently display on the display surface (19) of the client computers (2) associated with one or more of the client user groups (52) (and as to particular embodiments one or more administrator computers (112) or instructor computers (113)), the video image display area (88), the media image display area (101), the annotation display area (87) and a combined video identifier display area (114) in which a plurality of combined video identifiers (115) can be displayed corresponding to a plurality of combined video files (97) stored in the server memory element (78) of the server computer (3) (as shown in the example of FIG. 16). The combined video-media module (111) can be further executed by click event with one of the plurality of combined video identifiers (115) to retrieve the corresponding combined video file (97) and play back the combined video image (98) in the video image display area (88) and retrieve the media files (13) corresponding to the time stamp such that presentation of the combined video image (98) in the video image display area (88) can be accompanied by presentation of the one or more media images (104) in the media image display area (101) in synchronized timed relation as originally determined by the client users (14) within corresponding client user group (52). The combined video-media module (119) can further function to display an annotation control icon (118) which by click event pauses the combined video image (98) (for example the "Add Comment" button shown in FIG. 17) which allows entry by a client user (14) (an administrator user (116) or an instructor user (117)) of one more annotations (90) into the annotation field (89). The annotation entry icon (91) (shown for example as a "Send" button in the examples of FIG. 17) which by user interaction displays the one or more annotations (90) in the annotation display area (87) on the display surface (19) of all the client computers (2) associated with the group address (66) (as shown in the example of FIG. 10).

Now referring generally to FIGS. 1 through 21, a particular embodiment of the collaborative group distance learning system (1) can alone or in combination with other embodiments above described include the elements of an asynchronous video communication integration system (120). Now referring primarily to FIGS. 1 and 2, the asynchronous video communication integration system (120) can include one or more server computers (3) each having server memory element (78). A server processor (121) in communication with a server memory element (78) can serve in whole or in part the computer program (9)(also referred to herein as the computer code) executable to display the graphical user interface (8) on the display surface (19) of one or a plurality of client computers (2), as above described. Now referring primarily to FIG. 3, as to particular embodiments, a client user identification module (122) can function to associate one each of a plurality of client user identifiers (60) with a corresponding one each of a plurality of client users (14). The computer program (9) can further include a client user identifier selection module (61) (as shown in the example of FIG. 2) which can function by click event on a client user element (62) (for example "Client Users" as shown in FIG. 3) to display a client user list (or similar feature which displays a plurality of client user identifiers (60) which by click event can be selected to be displayed in a client user identifier area (59). A client user identifier allocation module (63) (as shown in FIG. 2) can function to display a client user identifier allocator icon (64) which by click event allows movement of one or more client user identifiers (60) from the client user identifier area (59) into one of the plurality of group areas (57) displayed on the display surface (19) to create one or more client user groups (52).

As to particular embodiments, the client user identifier allocator icon (64) can include a pointer (44) which by click event can discretely drag and drop each of the plurality of client user identifiers (60) from the client user identifier area (59) into one of the plurality of group areas (57) to create one or more client user groups (52). In the asynchronous video communication integration system (120), the client user identifier allocator icon (64) can be utilized to pair a first client user identifier (123) associated with a first client user (124) with a second client user identifier (125) associated with a second client user (126) in one or more group areas (57). As to particular embodiments, a pairing module (127) can function to associate one each of the plurality of client user identifiers (60) with a corresponding one each of a plurality of client users (14) and subsequently pair a first client user identifier (123) associated with a first client user (124) with a second client user identifier (125) associated with a second client user (126) to create paired first and second client users (124)(126).

Now referring primarily to FIGS. 5 and 18, by click event of the assignment activity access icon (74), which includes in part or in whole an asynchronous video communication (128) between the paired first and second client user (124) (126), an asynchronous video communication integration module (129) can function to display a graphical user interface (8) having common format on the display surface (19) of each one of a first client computer (130) associated with the first client user identifier (123) of the first client user (124) and the second client computer (131) associated with the second client user identifier (125) of the second client user (126) to facilitate asynchronous video communication (128) between the paired first and second client users (124)(126). The asynchronous video communication integration module (129) can further function to display the graphical user interface (8) on a display surface (19) of a first client computer (130) associated with said first client user identifier (123), the graphical user interface (8) including the video image capture area (80) (as shown in the example of FIG. 8 and above described). The video image capture device selector (82) in the graphical user interface (8) displayed on the display surface (19) of said first client computer (130) can by first client user interaction allow selection of a first, image capture device (132). The audio capture device selector (82) in the graphical user interface (8) displayed on said display surface (19) of the first client computer (130) can by first client user interaction allow selection of a first audio capture device (133). The asynchronous video communication integration module (129) can further function to display the image-audio capture control icon (85) (for example, the "Allow" button as shown in FIG. 8) which by click event initiates capture of the image (11) associated with the audio (84) of the first client user (124)(as shown in the example of FIG. 9 or 18) and conversion of the video image (11) and associated audio (84) content into a first video file (134). The graphical user interface (8) can further include a submission control element (68) (for example, the "Close" button shown in FIG. 9) which by click event stores the first video file (134) in the server memory element (78) as a first asynchronous video communication (135) between the first client user (124) and the second client user (126).

Now referring primarily to FIG. 19, the asynchronous video communication integration module (129) can subsequently function to concurrently display the video image display area (88) and the video image capture area (80) in the graphical user interface (8) on the display surface (19) of the second client computer (131). The image capture device selector (82) can be displayed in the graphical user interface (8) on the display surface (19) of the second client computer (131) which by second client user interaction allows selection of a second image capture device (136). The audio capture device selector (83) can be displayed in the graphical user interface (8) on the display surface (19) of the second client computer (126) which by second client user interaction allows selection of a second audio capture device (137). The asynchronous video communication integration module (129) can further function to display the image-audio capture control icon (85) (for example, the "Allow" button shown in FIG. 8) which by click event first initiates retrieval and playback of the first video file (134) in the video image display area (88) in the graphical user interface (8) on the display surface (19) of the second client computer (131). The occurrence of the playback of the first video file (134) can be coincident or separated by a time duration from the storage of the first video file (134) in the server memory element (78), but in either event remains a discrete video file. The playback of the first video file (134) becomes the first asynchronous video communication (135) to which the second client user (126) responds. The asynchronous video communication integration module (129) subsequently operates to capture of the image (11) associated with the audio (84) of the second client user (126) responding to the first asynchronous video communication (135) (as shown in the example of FIG. 19) and conversion of the video image (11) and associated audio (84) content into a second video file (138). The graphical user interface (8) can further include a submission control element (68) (for example, the "Close" button shown in FIG. 9) which by click event stores the second video file (138) in the server memory element (78) of the server computer (3). The first and second video files (134)(138) can be stored as discrete video files.

As to particular embodiments, the asynchronous video communication integration module (129) can further include a timer module (149) which can be adjusted to set a fixed amount of image capture time (150) between an image capture start point (151) at which the first client user (124) or the second client user (124) initiates capture of the image (11) associated with the audio (84) and an image capture end point (152) which terminates capture of the image (11) associated with the audio (84).

The timer module (149) can further function on the playback of the first video file (134) or the second video file (138)(and subsequent video files) on the display surface of the first client computer (130) or second client computer (131), as above described, to identify occurrence of a video file play back end point (153). The timer module (149) can be adjusted to set a fixed amount of response time (154) between the video file playback end point (153) and the subsequent image capture start point (151).

As to particular embodiments, the fixed amount of capture time (150) and the fixed amount of response time (154) can be pre-selected as part of the assignment activity (73). The fixed amount of capture time (150) or the fixed amount of response time (154) can be adjusted to be substantially equal for both the first client user (130) and the second client user (131), or unequal between the first client user (130) and the second client user (131). Additionally, the fixed amount of capture time (150) can be adjusted to be substantially equal or unequal between the first video file (134), the second video file (138) and subsequent video files, and the fixed amount of response time (154) can be substantially equal or unequal between the video file play back end point (153) and the image capture start point (151) between the first video file (134), the second video file (138) and subsequent video files. By incorporating the fixed amount of image capture time (150) and the fixed amount of response time (154) into the assignment activity (73), the first client user (130) and the second client user (131) can be required to participate in an asynchronous video communication (128) which can mimic an in person synchronous communication. \

Now referring primarily to FIG. 20, the asynchronous video communication integration module (129) can further function to concurrently display the video image display area (88) and the video image capture area (80) in the graphical user interface (8) on the display surface (19) of the first client computer (130). The image capture device selector (82) can be displayed in the graphical user interface (8) on the display surface (19) of the first client computer (130) which by first client user interaction allows selection of the first image capture device (132). The audio capture device selector (83) can be displayed in the graphical user interface (8) on the display surface (19) of the first client computer (131) which by first client user interaction allows selection of the first audio capture device (133). The asynchronous video communication integration module (129) can further function to display the image-audio capture control icon (85) (for example, the "Allow" button shown in FIG. 8) which by click event first initiates retrieval and playback of the second video file (138) in the video image display area (88) in the graphical user interface (8) on the display surface (19) of the first client computer (131). The occurrence of the playback of the second video file (138) can be coincident or separated by a time duration from storage of the second video file (138) in the server memory element (78), but in either event remains a discrete video file. The playback of the second video file (138) becomes the second asynchronous video communication (139) to which the first client user (124) responds. Secondly, the asynchronous video communication integration module (129) operates to capture the image (11) associated with the audio (84) of the first client user (124) (as shown in the example of FIG. 20) and conversion of the video image (11) and associated audio (84) content into a third video file (140). The graphical user interface (8) can further include a submission control element (68) (for example, the "Close" button shown in FIG. 9) which by click event stores the third video file (140) in the server memory element (78). Playback of the third video file (140) in the video image display area (88) in the graphical user interface (8) on the display surface (19) of the second client computer (131) becomes a third asynchronous communication (141) between the first client user (124) and the second client user (126).

The first and second client user (124)(126) can reciprocally asynchronously respond to play back of a series of video files, as above described, to generate an asynchronous video communication (128). The asynchronous video communication (128) can, but does not necessarily include, a fixed number of video files, a fixed time duration of any one of the video files, or a fixed time duration between asynchronous video communications). Generation of a final video file (142) terminates the asynchronous video communication (128).

Now referring primarily to FIGS. 1, 2, 21A and 21B, the asynchronous video communication integration system (120) can further include a video file serial order assembly module (143) which functions upon storage of the second video file (138) or other final video file (142) in an asynchronous video communication (128) between the first client user (124) and the second client user (126) to serially order in ascending synchronous timed relation (most distant in time first and most recent in time last) the first video file (134) stored as the first asynchronous video communication (135) and the second video file (138)(or final video file (142)) stored as the second asynchronous communication (139) (or final asynchronous communication (144)). The video file serial order assembly module (143) can further function to couple the first video file (134) through the final video file (142) generated in the asynchronous video communication (128) of the first and second client user (124) (126) in ascending synchronous timed relation to produce a combined video file (97). The combined video file (97) can be stored in the server memory element (78) of the server computer (3) in a form which can be retrieved and played back in the video image display area (88) of the graphical user interface (8) displayed on the display surface (19) of each one of the first or second client computer (130)(131) as one combined video image (8) of an integrated synchronous communication (148) (plays back as a continuous communication) between the first client user (124) and the second client user (126).

Now referring primarily to FIG. 22, the asynchronous video communication integration module (129) can further function to display the graphical user interface (8) on a display surface (19) of the first client computer (130) associated with the first client user identifier (123) or the second client computer (131) associated with the second client identifier (125) including the video image display area (88). The first client user (124) or the second client user (126) can retrieve and playback the combined video file (97) in the video image display area (88) in the graphical user interface (8) on said display surface (19) of the first client computer (130) associated with said first client user identifier (123) or the second client computer (131) associated with said second client identifier (125) as a synchronous video communication (144). As to particular embodiments, the asynchronous video communication integration module (129) can further function to display the graphical user interface (8) on a display surface of a third client computer (145) associated with a third client user identifier (146) of a third client user (147) within the client user group (52). The asynchronous video communication integration module (129) can further function to display the video image display area (88) in the graphical user interface (8) on the display surface (19) of the third client computer (145) associated with the third client user identifier (145) and playback the combined video image (98) in the video image display area (88) displayed in the graphical user interface (8) on the display surface (19) of the third client computer (145) associated with the third client user identifier (146).

Again referring to primarily to FIG. 22, the asynchronous video communication integration module (129) can further function to concurrently display the video image display area (88) and the annotation display area (87), above described, on the display surface (19) of the plurality of computers (2) associated with the plurality of client user identifiers (60) of the client user group (52). The asynchronous video communication integration module (129) can further function to display an annotation control icon (118) along with an annotation field (89). By client user interaction with the annotation control icon (188), as above described, play back of the combined video image (98) as a synchronous video communication (148) of the first client user (124) and the second client user (126) can be paused in the video image display area (88), which by client user interaction, allows entry of one more annotations (90) into the annotation field (89). The asynchronous video communication integration module (129) can further function to synchronize the one or more annotations (90) entered into the annotation field (89) in the annotation display area (87) in timed relation to display of said combined video image (98) in the video image display area (88) at the pause time of the combined video image (98), as above described. The asynchronous video communication integration module (129) can further function to store the one or more annotations (90) in the annotation display area (87) in the server memory element (78) of the server computer (3) each coupled at the corresponding pause time of the combined video image (98) as above described.

Now referring to FIG. 22, the asynchronous video communication integration module (129) can further function in response to client user interaction in the graphical user interface (8) to retrieve and play back the combined video image (98) in the video image display area (88) in the graphical user interface (8) displayed on the display surface (19) of one or more of the plurality of computers (2) associated with said plurality of client user identifiers (60) of the client user group (52), and display the annotations (90) in the concurrently displayed annotation display area (87) in synchronized timed relation to display of the combined video image (98) in the video image display area (88).

As can be easily understood from the foregoing, the basic concepts of the present invention may be embodied in a variety of ways. The invention involves numerous and varied embodiments of an interactive oral presentation display system and methods making and using an interactive display for oral presentation.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "a user interface" should be understood to encompass disclosure of the act of "using an interface"—whether explicitly discussed or not—and, conversely, were there effectively disclosure of the act of "using an interface", such a disclosure should be understood to encompass disclosure of "a user interface" and even a "means for using an interface." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment.

Thus the applicant(s) should be understood to claim at least: i) an interactive oral presentation display system as herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this patent specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:
1. A computer system, comprising:
a memory element of a server computer;
a processor in communication with said memory element, said memory element including a computer code executable to:
    depict a group creation area on a display surface of a first client computer which by user interaction group identifiers can be entered into said group creation area;
    concurrently depict a plurality of client user group areas on said display surface each identified by one of said group identifiers entered into said group creation area;
    depict a client user identifier area separate from said plurality of client user group areas depicted on said display surface, said client user identifier area only including a plurality of client user identifiers not associated with any one of said plurality of client user group areas, said plurality of client user identifiers correspondingly associated with a plurality of client users;
    move each of said plurality of client user identifiers from said client user identifier area to one of said plurality of client user group areas concurrently depicted on said display surface to associate each of said plurality of client user identifiers within said client user group area with one of a plurality of client user groups concurrently depicted on said display surface, wherein movement of each of said plurality of client user identifiers from said client user identification area removes each of said plurality of client user identifiers from said client user identifier area, wherein said plurality of client users within a client user group having access to a graphical user interface concurrently depicting a video image capture area and video image display area;
    pair a first client user identifier associated with a first client user with a second client user identifier associated with a second client user, said first and second client users within a client user group having access to said graphical user interface;
    display said graphical user interface on a display surface of a first client computer associated with said first client user identifier, said graphical user interface concurrently depicts said video image display area and said video image capture area;
    display a video image capture device selector in said graphical user interface displayed on said display surface of said first client computer which by first client user interaction allows selection of a first image capture device;
    display an audio capture device selector in said graphical user interface displayed on said display surface of said first client computer which by first client user interaction allows selection of a first audio capture device;
    operate said first image capture device and said first audio capture device to capture a live stream of a first video and associated audio content of said first client user over a first predetermined period of time, said live stream displayed in said video image capture area in said graphical user interface displayed on said display surface of said first client computer;

convert said live stream of said first video and associated audio content into a first video file; and store said first video file in said server computer as a first asynchronous communication between said first client user and said second client user.

2. The computer system of claim 1, wherein said a computer code is further executable to:

concurrently display said video image display area and said video image capture area in said graphical user interface on said display surface of said second client computer;

display said video image capture device selector in said graphical user interface on said display surface of said second client computer which by second client user interaction allows selection of a second image capture device;

display said audio capture device selector in said graphical user interface on said display surface of said second client computer which by second client user interaction allows selection of a second audio capture device;

playback said first video file in said video image display area in said graphical user interface on said display surface of said second client computer;

operating said second image capture device and said second audio capture device to capture a live stream of a second video and associated audio content of said second client user over a second predetermined period of time, said first and second predetermined periods of time allocated prior to operation of said first and second image and audio devices, said live stream displayed in said video image capture area displayed in said graphical user interface on said display surface of said second client computer;

convert said live stream of said second video image and associated audio content into a second video file; and store said second video file in said server computer as a second asynchronous communication between said first client user and said second client user.

3. The computer system of claim 2, wherein said a computer code is further executable to:

serially order said first video file stored as said first asynchronous communication and said second video file stored as said second asynchronous communication in ascending synchronous timed relation; and couple said first video file and said second video file in ascending synchronous timed relation to produce a combined video file which plays back as a synchronous communication.

4. The computer system of claim 3, wherein said a computer code is further executable to: display said graphical user interface on a display surface of said first client computer associated with said first client user identifier or said second client computer associated with said second client identifier;

display said video image display area in said graphical user interface on said display surface of said first client computer associated with said first client user identifier or said second client computer associated with said second client identifier;

playback said combined video file in said video image display area in said graphical user interface on said display surface of said first client computer associated with said first client user identifier or said second client computer associated with said second client identifier as a synchronous communication.

5. The computer system of claim 4, wherein said a computer code is further executable to:

display said graphical user interface on a display surface of a third client computer associated with a third client user identifier;

display said video image display area in said graphical user interface on said display surface of said third client computer associated with said third client user identifier;

playback said combined video in said video image display area displayed in said graphical user interface on said display surface of said third client computer associated with said third client user identifier.

6. The computer system of claim 4, wherein said a computer code is further executable to:

concurrently display an annotation display area and said video image display area on said display surface of said plurality of computers associated with said plurality of client user identifiers of said client user group;

display an annotation field which by client user interaction allows direct entry of one more annotations into an annotation field; and display an annotation entry icon which by client user interaction displays said one or more annotations in said annotation display area on said display surface.

7. The computer system of claim 6, wherein said a computer code is further executable to: display an annotation control icon which by user interaction:

pauses display of said combined video image in said video image display area of said graphical user interface on said display surface of said plurality of computers associated with said plurality of client user identifiers of said client user group to allow entry by client user interaction of said one or more annotations into said annotation field; and synchronizes said one or more annotations entered into said annotation display area in timed relation to display of said combined video image in said video image display area at said pause time of said combined video image.

8. The computer system of claim 7, wherein said a computer code is further executable to: display said combined video image in said video display area in said graphical user interface displayed on said display surface of said plurality of computers associated with said plurality of client user identifiers of said client user group; and display said annotations in said annotation display area in synchronized timed relation to display of said combined video image in said video image display area.

9. The computer system of claim 3, wherein said a computer code is further executable to: display a graphical user interface on a display surface of said first client computer associated with said first client user identifier;

concurrently display said video image display area and said video image capture area in said graphical user interface on said display surface of said first client computer;

display said video image capture device selector on said display surface of said first client computer which by first client user interaction allows selection of said first image capture device;

display said audio capture device selector on said display surface of said first client computer which by first client user interaction allows selection of said first audio capture device;

playback said second video file in said video image display area in said graphical user interface on said display surface of said first client computer;

operating said first image capture device and said first audio capture device to capture a live stream of a third video image and associated audio content of said first client user, said live stream displayed in said video image capture area displayed in said graphical user interface on said display surface of said first client computer;

convert said live stream of said third video image and associated audio content into a third video file; and store said third video file in said server computer as a third asynchronous communication between said first client user and said second client user.

10. A method of asynchronous communication in a computer system, comprising:

depicting a group creation area on a display surface of a first client computer which by user interaction group identifiers can be entered into said group creation area;

concurrently depicting a plurality of client user group areas on said display surface each identified by one of said group identifiers entered into said group creation area;

depicting a client user identifier area separate from said plurality of client user group area depicted on said display surface, said client user identifier area including a plurality of client user identifiers not associated with a client user group area, said plurality of client user identifiers correspondingly associated with a plurality of client users;

moving each of said plurality of client user identifiers from said client user identifier area to one of said plurality of client user group areas concurrently depicted on said display surface to associate each of said plurality of client user identifiers within said client user group area with one of a plurality of client user groups concurrently depicted on said display surface, wherein movement of each of said plurality of client user identifiers from said client user identification area removes each of said plurality of client user identifiers from said client user identifier area, wherein said plurality of client users within a client user group having access to a graphical user interface concurrently depicting a video image capture area and video image display area;

connecting a plurality of client computers associated with said plurality of client user identifiers within each of said plurality of client user groups to a server computer;

interconnecting a first client computer associated with a first client user identifier of a first client user with a second computer associated with a second client user identifier of a second client user, said first and second client users within a client user group having access to said graphical user interface;

displaying a graphical user interface on a display surface of a first client computer associated with said first client user identifier, said graphical user interface concurrently displaying a video image display area and a video image capture area;

operating a first image capture device and a first audio capture device associated with said first client computer;

capturing a live stream of a first video image and associated audio content of said first client user, said live stream displayed in said video image capture area in said graphical user interface displayed on said display surface of said first client computer;

converting said live stream of said first video image and associated audio content into a first video file;

storing said first video file in said server computer;

displaying said graphical user interface on a display surface of said second client computer, said graphical user interface concurrently displaying a video image display area and a video image capture area;

playing back said first video file in said video image display area in said graphical user interface on said display surface of said second client computer, thereby providing a first asynchronous video communication between said first client user and said second client user;

operating said second image capture device and said second audio capture device to capture a live stream of a second video image and associated audio content of said second client user displayed in said video image capture area displayed in said graphical user interface on said display surface of said second client computer, thereby generating a second asynchronous video communication in response to said first asynchronous communication;

converting said live stream of said second video image and associated audio content into a second video file;

storing said first video file in said server computer;

coupling said first and second video files in ascending synchronous timed relation to generate a combined video file capable of playback as one continuous video;

playing back said combined video file in said video image display area in said graphical user interface on said display surface of said first or said second client computer, thereby providing a synchronous video communication between said first and said second client user.

11. The method of asynchronous communication in a computer system of claim 10, further comprising:

concurrently displaying an annotation display area and said video image display area in said graphical user interface displayed on said display surface of said first or second client computer;

displaying an annotation field which by client user interaction allows entry of one more annotations into an annotation field; and displaying an annotation control icon which by client user interaction displays said one or more annotations in said annotation display area on said display surface.

12. The method of asynchronous communication in a computer system of claim 11, further comprising:

pausing display of said combined video image in said video image display area by user interaction with said annotation control icon to allow entry by client user interaction of said one or more annotations into said annotation field; and synchronizing said one or more annotations entered into said annotation display area in timed relation to display of said combined video image in said video image display area at a pause time of said combined video image.

13. The method of asynchronous communication in a computer system of claim 12, further comprising:

playing back said combined video image in said video display area in said graphical user interface displayed on said display surface of first or second client computers; and displaying said annotations in said annotation display area in synchronized timed relation to play back of said combined video image in said video image display area.

14. The method of asynchronous communication in a computer system of claim 13, further comprising:

associating each of a plurality of computers with one of a plurality of user identifiers to form a client user group, wherein said client user group includes said first client computer associated with said first client user identifier of a first client user or said second computer associated with said second client user identifier of said second client user:

displaying said graphical user interface on a display surface of a third client computer associated with a third client user identifier in said client user group;

displaying said video image display area in said graphical user interface on said display surface of said third client computer associated with said third client user identifier;

playing back said combined video in said video image display area displayed in said graphical user interface on said display surface of said third client computer associated with said third client user identifier.

15. The method of asynchronous communication in a computer system of claim 14, further comprising:

concurrently displaying an annotation display area and said video image display area on said display surface of said third client computer associated with said third client user identifier of said client user group;

displaying said annotation field which by client user interaction allows entry of one more annotations into an annotation field;

pausing display of said combined video image in said video image display area by user interaction with said annotation control icon to allow entry by client user interaction of said one or more annotations into said annotation field;

displaying said one or more annotations in said annotation display area by client user interaction with said annotation control icon; and synchronizing said one or more annotations entered into said annotation display area in timed relation to display of said combined video image in said video image display area at a pause time of said combined video image.

16. The method of asynchronous communication in a computer system of claim 15, further comprising:

playing back said combined video image in said video display area in said graphical user interface displayed on said display surface of one or more of said plurality of computers having one of said plurality of user identifiers in said client user group; and displaying said annotations in said annotation display area in synchronized timed relation to play back of said combined video image in said video image display area.

17. The method of asynchronous communication in a computer system of claim 16, further comprising:

displaying a video image capture device selector in said graphical user interface displayed on said display surface of said first client computer and said second client computer which by first or second client user interaction respectively allows selection of said first image capture device or said second image capture device; and displaying an audio capture device selector in said graphical user interface displayed on said display surface of said first client computer and said second client computer which by first or second client user interaction respectively allows selection of said first audio capture device or said second audio capture device.

18. A computer system, comprising:

a server computer having a server memory;

a first client computer and a second client computer each connected to said server computer;

a first video image capture device coupled to said first client computer, said first video image capture device configured to capture a live stream of an image of a first client user;

a first audio capture device coupled to said first client computer, said first audio capture device configured to capture audio content associated with said live stream of said image of said first client user;

a second video image capture device coupled to said second client computer, said second video image capture device configured to capture a live stream of an image of a second client user;

a second audio capture device coupled to said second client computer, said second audio capture device configured to capture audio content associated with said live stream of said image of said second client user; and a computer code served by said server computer to said first computer to implement a graphical user interface which displays:

a group creation area on a display surface of a first client computer which by user interaction group identifiers can be entered into said group creation area;

a plurality of client user group areas concurrently on said display surface each identified by one of said group identifiers entered into said group creation area;

a client user identifier area separate from said plurality of client user group area depicted on said display surface, said client user identifier area including a plurality of client user identifiers not associated with a client user group area, said plurality of client user identifiers correspondingly associated with a plurality of client users;

a cursor which by user interaction moves each of said plurality of client user identifiers from said client user identifier area to one of said plurality of client user group areas concurrently depicted on said display surface to associate each of said plurality of client user identifiers within said client user group area with one of a plurality of client user groups concurrently depicted on said display surface, wherein movement of each of said plurality of client user identifiers from said client user identifier area removes each of said plurality of client user identifiers from said client user identifier area, wherein said plurality of client users within said client user group having access to said graphical user interface which concurrently displays a video image capture area and video image display area in said graphical user interface on said display surface of said first and second client computers.

19. The computer system of claim 18, wherein said video image capture area of said first computer displays said live stream of said image of a first client user and records said associated audio content, said live stream of said image and said associated audio content of said first client user saved as a first video file in a server memory element of said computer server.

20. The computer system of claim 19, wherein said first video file plays back in said video image display area associated with said second client computer as a first asynchronous video communication, said video image capture area of said second client computer subsequently displays said image of said second client user correspondingly captured by said second image capture device as said second client user responds to said first asynchronous video communication, said image and said associated audio content of said second client user saved as a second video file in a memory element of said computer server.

21. The computer system of claim 20, wherein said second video file plays back in said video image display area associated with said first client computer as a second asynchronous video communication, said video image capture area of said first client computer subsequently displays said image of said first client user correspondingly captured by said second image capture device as said first client user responds to said second asynchronous video communication, said image and said associated audio content of said first client user saved as a third video file in a memory element of said computer server.

22. The computer system of claim 21, wherein said computer code further comprises an asynchronous video communication integrator which functions to generate a combined video comprising said first video, said second video, and said third video, said combined video plays back in said video image display area as one continuous synchronous video communication.

\* \* \* \* \*